United States Patent
Yang et al.

(10) Patent No.: US 9,772,703 B2
(45) Date of Patent: Sep. 26, 2017

(54) CONTROL METHOD AND ELECTRONIC APPARATUS

(71) Applicant: LENOVO (BEIJING) CO., LTD., Beijing (CN)

(72) Inventors: Guang Yang, Beijing (CN); Na Ju, Beijing (CN); Lifeng Fan, Beijing (CN); Ke Shang, Beijing (CN); Qi Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 511 days.

(21) Appl. No.: 13/938,690

(22) Filed: Jul. 10, 2013

(65) Prior Publication Data
US 2014/0015779 A1    Jan. 16, 2014

(30) Foreign Application Priority Data

Jul. 10, 2012  (CN) .......................... 2012 1 0238669
Jul. 10, 2012  (CN) .......................... 2012 1 0239639
Sep. 24, 2012  (CN) .......................... 2012 1 0359308

(51) Int. Cl.
*G09G 5/00* (2006.01)
*G06F 3/041* (2006.01)
(Continued)

(52) U.S. Cl.
CPC .......... *G06F 3/0412* (2013.01); *G06F 3/0416* (2013.01); *G06F 3/0488* (2013.01); *G06F 3/04842* (2013.01); *G06F 2203/04104* (2013.01)

(58) Field of Classification Search
CPC .. G06F 3/03547; G06F 3/041; G06F 345/174; G06F 3/044; G06F 3/045;
(Continued)

(56) References Cited

U.S. PATENT DOCUMENTS 5,671,380 A  *  9/1997  Hidaka  ............... G06F 3/04817
                                                  715/861
7,339,636 B2     3/2008  Voloschenko et al.
(Continued)

FOREIGN PATENT DOCUMENTS

CN      101339450        1/2009
CN      101833873 A      9/2010
(Continued)

OTHER PUBLICATIONS

Chinese Patent Application 201210239639.6, Chinese Patent Office, First Office Action mailed Sep. 2, 2015; 7 pages.
(Continued)

*Primary Examiner* — Jennifer Nguyen
(74) *Attorney, Agent, or Firm* — Dentons US LLP; Peter Su

(57) ABSTRACT

This application discloses a control method of electronic apparatus and an electronic apparatus, wherein the electronic apparatus includes a touch control unit, on which there is at least one operating icon. The control method comprises determining a first touch region corresponding to the at least one operating icon, wherein, an area of the first touch region is less than the area of the touch control unit; determining a second touch region on the touch control unit according to the first touch region, wherein, the second touch region is a region other than the first touch region on the touch control unit; generating a control instruction for making touch function of the second touch region to be in a disable status; and executing the control instruction to make the touch function of the second touch region to be in the disable status.

21 Claims, 15 Drawing Sheets

(51) Int. Cl.
  *G06F 3/0488* (2013.01)
  *G06F 3/0484* (2013.01)
(58) Field of Classification Search
  CPC .... G06F 3/04812; G06F 3/04817; G06F 8/34; G06F 3/04842
  USPC .......................... 345/173–178; 715/856, 863
  See application file for complete search history.

(56) References Cited

U.S. PATENT DOCUMENTS

| | | | |
|---|---|---|---|
| 8,633,903 B2* | 1/2014 | Kim | G06F 3/044 345/103 |
| 2009/0066665 A1 | 3/2009 | Lee | |
| 2010/0090970 A1* | 4/2010 | Lin | G06F 1/1609 345/173 |
| 2012/0026200 A1* | 2/2012 | Okada | G06F 3/04886 345/660 |
| 2012/0090757 A1 | 4/2012 | Buchan et al. | |
| 2013/0016046 A1* | 1/2013 | Chou | G06F 1/3262 345/173 |

FOREIGN PATENT DOCUMENTS

| | | |
|---|---|---|
| CN | 102236442 | 11/2011 |
| JP | 2003219024 | 7/2003 |

OTHER PUBLICATIONS

English Text of First Office Action for Chinese Patent Application 201210239639.6, Chinese Patent Office, First Office Action mailed Sep. 2, 2015; 5 pages.
English Translation of Japanese Patent Application No. 2003219024 A, entitled "Information Processing Terminal," Published on Jul. 31, 2003; 10 pages.
English Abstract of Chinese Patent Application 101339450 A, Chinese Patent Office, published on Jan. 7, 2009; 1 page.
Chinese Patent Application 201210359308.6, Chinese Patent Office, First Office Action mailed Dec. 31, 2015; 9 pages.
English Text of First Office Action for Chinese Patent Application 201210359308.6, Chinese Patent Office, First Office Action mailed Dec. 31, 2015; 8 pages.
Chinese Patent Application CN 201210238669.5, Chinese Patent Office, First Office Action mailed on Dec. 3, 2015; 6 pages.
English Text of First Office Action for Chinese Patent Application CN 201210238669.5, Chinese Patent Office, First Office Action mailed on Dec. 3, 2015; 4 pages.
English Translation of Chinese Patent Application CN102236442 (A), published on Nov. 9, 2011, entitled "Touchpad Control System and Method," Hongfujin Prec Ind Shenzhen; Hon Hai Prec Ind Co Ltd.; 9 pages.
Chinese Patent Application CN 201210239639.6, Chinese Patent Office, Second Office Action mailed on Apr. 26, 2016; 6 pages.
English Text of Second Office Action for Chinese Patent Application CN 201210239639.6, Chinese Patent Office, Second Office Action mailed on Apr. 26, 2016; 5 pages.
Chinese Patent Application CN 201210359308.6, Chinese Patent Office, Second Office Action mailed on Aug. 30, 2016; 8 pages.
English Text of Second Office Action for Chinese Patent Application CN 201210359308.6, Chinese Patent Office, Second Office Action mailed on Aug. 30, 2016; 8 pages.
Third Office Action issued in connection to Chinese Patent Application CN 201210238669.5, Chinese Patent Office, Third Office Action dated on Mar. 22, 2017; 4 pages.
English Text Translation of Third Office Action issued in connection to Chinese Patent Application CN 201210238669.5, Chinese Patent Office, Third Office Action mailed on Mar. 22, 2017; 4 pages.
English Translation of Chinese Patent Application CN 101833873 (A); published on Sep. 15, 2010, entitled "Electronic book with split display function," Hongfujin Prec Ind Shenzhen; Hon Hai Prec Ind Co Ltd; 5 pages.
Third Office Action issued in connection to Chinese Patent Application CN 201210238669.5, Chinese Patent Office, Third Office Action dated on May 22, 2017; 4 pages.
English Text Translation of Third Office Action issued in connection to Chinese Patent Application CN 201210238669.5, Chinese Patent Office, Third Office Action dated on May 22, 2017; 4 pages.

* cited by examiner

CONTROL METHOD AND ELECTRONIC APPARATUS

CROSS REFERENCE TO RELATED APPLICATIONS

This application claims the benefit under 35 U.S.C. §119 (a) of Chinese Patent Application Nos. CN 201210238669.5, filed on Jul. 10, 2012, CN 201210239639.6, filed on Jul. 10, 2012, and CN 201210359308.6, filed on Sep. 24, 2012, the entire disclosures of which are incorporated by reference herein in their entireties.

BACKGROUND

The present invention relates to the field of electronic technology and in particular, to a control method and an electronic apparatus.

Recently, when a user uses an electronic apparatus having a touch control function, there are many icons arranged on the display screen of the electronic apparatus. When the user needs to operate a certain icon, he or she clicks the icon, and when the touch control unit of the electronic apparatus receives the click operation of the user, it controls to open the icon function corresponding to the icon.

The applicant finds that in the procedure of implementing this application, there are at least the following technical problems in the prior art:

When an icon function of a certain icon is opened correspondingly in the electronic apparatus, even if the user only clicks this icon, the electronic apparatus performs a full screen scanning search on the display screen to scan the remaining unused icons one by one, and then it determines to open the icon function corresponding to the icon clicked by the user.

Therefore, in the prior art, the technical solution of carrying out the full screen scanning of the electronic apparatus consumes too much electric power in the electronic apparatus, which makes the electronic apparatus incapable of saving power.

SUMMARY

The present invention provides a control method of an electronic apparatus and the electronic apparatus to solve the technical problems of the incapability of saving power in the prior art.

On the one hand, the present invention provides the following technical solution according to the embodiment of this application:

A control method of an electronic apparatus is provided, the electronic apparatus including a touch control unit, on which there is at least one operating icon, and the method comprises:

Determining a first touch region corresponding to the at least one operating icon, wherein, an area of the first touch region is less than the area of the touch control unit; determining a second touch region on the touch control unit according to the first touch region, wherein, the second touch region is a region other than the first touch region on the touch control unit; generating a control instruction for making the touch function of the second touch region in a disable status; and executing the control instruction to make the touch function of the second touch region in the disable status.

Preferably, the determining the first touch region, corresponding to the at least one operating icon, specifically comprises determining a first coordinate information in the touch control unit corresponding to each of the operating icons in the at least one operating icon, wherein, the first coordinate information includes a first start coordinate information and a first end coordinate information; and determining the first touch region, corresponding to the at least one operating icon, according to the first coordinate information.

Preferably, the determining the first touch region, corresponding to the at least one operating icon according to the first coordinate information, specifically comprises arranging at least one operating icon based on a preset rule of the system of the electronic apparatus, according to the first coordinate information, to obtain a second coordinate information corresponding to the first touch region, wherein the second coordinate information includes a second start coordinate information and a second end coordinate information; and determining the first touch region, corresponding to the at least one operating icon, according to the second coordinate information.

On the other hand, the present invention provides an electronic apparatus, according to the embodiment of this application, the electronic apparatus including a touch control unit, on which there are at least one operating icon, and the electronic apparatus comprises a first determining unit for determining a first touch region corresponding, to at least one operating icon, wherein an area of the first touch region is less than the area of the touch control unit; a second determining unit for determining a second touch region on the touch control unit according to the first touch region, wherein, the second touch region is a region other than the first touch region on the touch control unit; a generating unit for generating a control instruction for making the touch function of the second touch region in a disable status; and an executing unit for executing the control instruction to make the touch function of the second touch region in the disable status.

Preferably, the second determining unit specifically comprises a third determining unit for determining a first coordinate information in the touch control unit, corresponding to each of the operating icons in the at least one operating icon, wherein, the first coordinate information includes a first start coordinate information and first end coordinate information; and a fourth determining unit for determining the first touch region corresponding to at least one operating icon according to the first coordinate information.

Preferably, the fourth determining unit specifically comprises an obtaining unit for arranging the at least one operating icon based on a preset rule of the system of the electronic apparatus, according to the first coordinate information, to obtain the second coordinate information corresponding to each of the operating icon in at least one operating icon, wherein, the second coordinate information includes a second start coordinate information and a second end coordinate information; and a fourth determining subunit for determining the first touch region corresponding to at least one operating icon according to the second coordinate information.

On the other hand, the present invention provides a control method of an electronic apparatus according to the embodiment of this application, which is applied in an electronic apparatus, the electronic apparatus including a touch control unit, on which there are a first touch region and a second touch region, wherein, the first touch region and the second touch region are generated by the method in the above-described technical solution, there includes at least one operating icon in the first touch region, there is a first operating icon in at least one operating icon, and the second touch region is a region other than the first touch region on the touch control unit, characterized in that, the method comprises detecting whether there is an open operation for opening the touch function of the first touch region when the touch function of the first touch region is in a disable status; generating a touch function open instruction in response to the open operation when there is the open operation; and executing the touch function open instruction to make the touch function of the first touch region in an enable status.

Preferably, after executing the touch function open instruction to make the touch function of the first touch region in the enable status, it further comprises the steps of detecting whether there is a touch operation in the first touch region to obtain a detection result, deciding whether the touch operation is a touch operation for touching to open the first operating icon when the detection result is YES to obtain a first decision result, and generating a touch open instruction according to the touch operation to control to open the first operating icon when the first decision result is YES.

Preferably, deciding whether the touch operation is the touch operation for touching to start the first operating icon in the first touch region specifically comprises obtaining the coordinate information of the touch operation, wherein the coordinate information includes a start coordinate information and an end coordinate information, and deciding whether the coordinate information satisfies a threshold of the coordinate information of the operating icon in the first touch region to obtain the first decision result.

Preferably, deciding whether the coordinate information satisfies the threshold of the coordinate information in the first touch region of the first operating icon in the first touch region specifically comprises deciding whether the start coordinate information satisfies a threshold of the start coordinate information of the first operating icon in the first touch region, deciding whether the end coordinate information satisfies a threshold of the end coordinate information of the first operating icon in the first touch region, or deciding whether the start coordinate information and the end coordinate information satisfy the threshold of the start coordinate information of the first operating icon in the first touch region and the threshold of the end coordinate information of the first operating icon in the first touch region, respectively.

On the other hand, the present invention provides an electronic apparatus according to another embodiment of this application. The electronic apparatus including a touch control unit, which includes a first touch region and a second touch region, wherein the first touch region and the second touch region are generated by the method in the above-described technical solution. There is at least one operating icon in the first touch region, there is a first operating icon in the at least one operating icon, and the second touch region is a region other than the first touch region on the touch control unit, characterized in the electronic apparatus that comprises a detecting unit for detecting whether there is an open operation for opening the touch function of the first touch region when the touch function of the first touch region is in a disable status; a generating unit for generating a touch function open instruction in response to the open operation when there is the open operation; and an executing unit for executing the touch function open instruction to make the touch function of the first touch region in an enable status.

Preferably, the electronic apparatus further comprises an obtaining unit for detecting whether there is a touch operation in the first touch region to obtain a detection result; a deciding unit for deciding whether the touch operation is the touch operation for touching to open the first operating icon in the first touch region when the detection result is YES to obtain a first decision result; and an opening unit for generating a touch open instruction according to the touch operation when the first decision result is YES, to control to open the first operating icon.

Preferably, the deciding unit specifically comprises an obtaining unit for obtaining the coordinate information of the touch operation, wherein, the coordinate information includes a start coordinate information and an end coordinate information; and a deciding subunit for deciding, in the first touch region, whether the coordinate information satisfies a threshold of the coordinate information of the first operating icon in the first touch region to obtain a first decision result.

Preferably, the deciding subunit specifically comprises a first deciding subunit for deciding whether the start coordinate information satisfies a threshold of the start coordinate information of the first operating icon in the first touch region; a second deciding subunit for deciding whether the end coordinate information satisfies a threshold of the end coordinate information of the first operating icon in the first touch region; or a third deciding subunit for deciding whether the start coordinate information and the end coordinate information satisfy the threshold of the start coordinate information of the first operating icon in the first touch region and the threshold of the end coordinate information of the first operating icon in the first touch region, respectively.

One or more technical solutions in the above-described technical solution at least have the following technical effects or advantages:

In this application, with one or more technical solutions, by providing a control method of an electronic apparatus to carry out a partition operation to the touch region in the touch control unit of the electronic apparatus and close unused touch function of the touch control unit, it achieves a purpose of saving power.

Further, since the icons are in a region, having touch function in the electronic apparatus, when the user clicks the icon, only a scanning search is carried out in the region having the touch function without a search in the full screen. Therefore, it achieves a purpose of saving power.

Further, when the first touch control unit is not used, it is made to be in a disable status, which further achieves a purpose of saving power.

DETAILED DESCRIPTION

In order to solve the technical problem of the incapability of power saving in the prior art, the first embodiment of the invention provides a control method of an electronic apparatus and the electronic apparatus. The overall concept of this solution is as follows:

In the electronic apparatus, the touch region on the display screen is carried out by a partition operation, and the unused touch function of the touch control unit is closed to achieve the purpose of power saving.

Further, since the icons are in a region having touch function in the electronic apparatus, when the user clicks the icon, only a scanning search is carried out in the region having touch function without a search in the full screen; therefore, it achieves a purpose of saving power.

Further, when the touch control unit having touch screen function is not used, it is made to be in a disable status, which further achieves a purpose of saving power.

The main implementation principle, the specific implementation procedure, and the advantageous effect achieved correspondingly of the first embodiment of the present invention are described in detail in connection with the accompanying drawings of the specification as follows.

First Embodiment

In the first embodiment of this application, it describes a control method of the electronic apparatus, wherein, the electronic apparatus includes a touch control unit, on which there is at least one operating icon.

Figure 1:
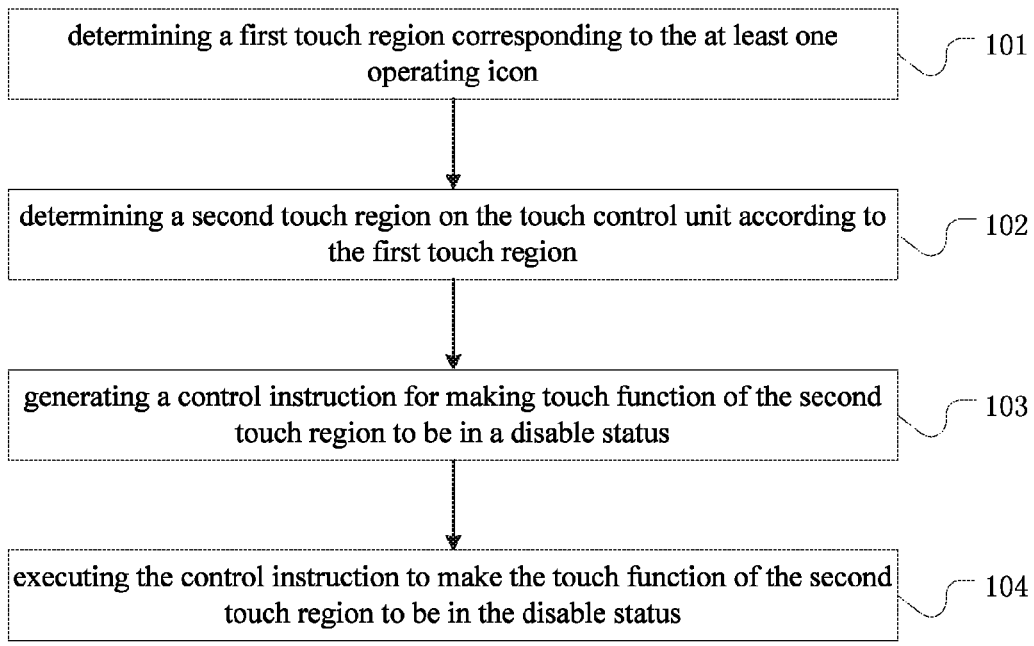
FIG. 1 is a flow chart of the control method of the electronic apparatus in the first embodiment of this application.

As shown in FIG. 1, the method comprises:

Step 101: determining a first touch region corresponding to the at least one operating icon.

Wherein, an area of the first touch region is less than the area of the touch control unit.

Figure 2:
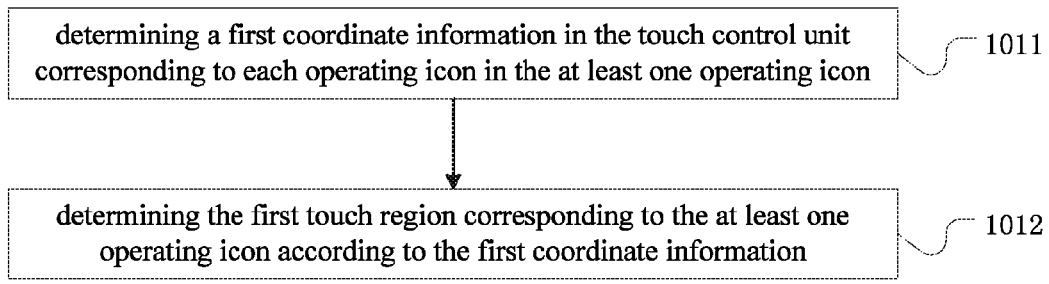
FIG. 2 is a flow chart of determining the first touch region through the coordinate information of the operating icon in the first embodiment of this application.

In the first embodiment of this application, the specific method of determining the first touch region is to determine through the coordinate information of operating icon as shown in FIG. 2.

Step 1011: determining a first coordinate information corresponding to each of the operating icon of at least one operating icon in the touch control unit.

Figure 3:
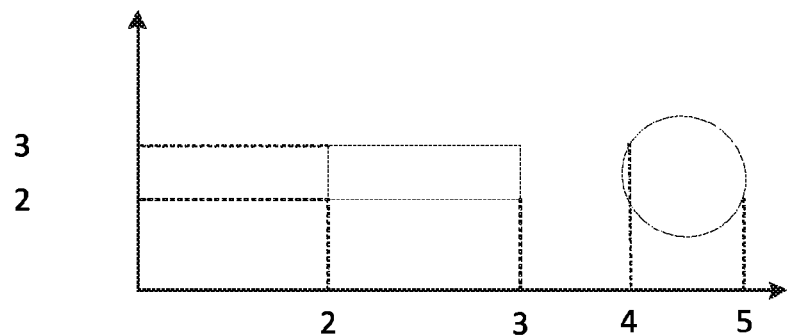
FIG. 3 is a schematic diagram of the coordinate information of the operating icon in the first embodiment of this application.

Wherein, the coordinate information of each operating icon in the electronic apparatus has two coordinate information, i.e., a first start coordinate information and a first end coordinate information. In the first embodiment of this application, as shown in FIG. 3, taking a square icon and a circle icon as example to describe a two-dimensional coordinate axes in FIG. 3. A square icon and a circle icon are in the coordinate axes, wherein the start coordinate information of the square icon is (3,2), and the end coordinate information of the square icon is (3,2). Therefore, the icon region extending with the above two coordinate information as symmetry axis is the region occupied by the coordinates of the square. The start coordinate information and the end coordinate information of the square icon are in two corners of the square icon. In addition, the coordinates can be determined by using the other two corners of the square region.

When the start coordinate information of the coordinates of the circle is (4,3), and the end coordinate information of the coordinates of the circle is (5,2), the rotation with the connection line between these two coordinate information as diameter is the region occupied by the circle coordinates, wherein, the region of the coordinates of the circle may also be determined by other coordinate information.

After determining the coordinate information of each icon, it enters into step 1012.

Step 1012: determining the first touch region corresponding to at least one operating icon according to the first coordinate information.

The method for determining the first touch region according to the coordinate information is as follows:

Firstly, the at least one operating icon is arranged based on a preset rule of the system of the electronic apparatus, according to the first coordinate information, to obtain the second coordinate information corresponding to the first touch region.

Wherein, the second coordinate information includes a second start coordinate information and a second end coordinate information.

Secondly, the first touch region corresponding to at least one operating icon is determined, according to the second coordinate information.

Figure 4:
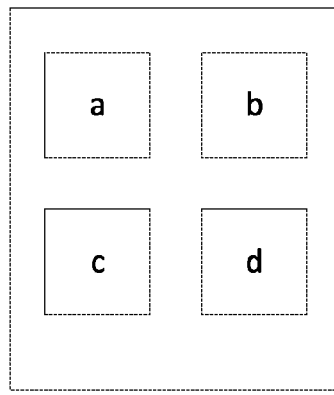
FIG. 4 is a schematic diagram of arranging the four icons a, b, c and d on the touch control unit in the first embodiment of this application.

In practice, the preset rule of the system of the electronic apparatus has various forms. When icons are arranged according to the coordinate information of the icons, one first touch region or a plurality of different first touch regions may be determined. For example, as shown in FIG. 4, there are four icons a, b, c, and d arranged on the touch control unit.

For example, the preset rule of the system of the electronic apparatus is each icon forming a first touch region separately, then the four icons a, b, c, and d each form the first region separately, according to the preset rule, and the second coordinate information is just the first coordinate information.

And when the preset rule of the system of the electronic apparatus is two of the icons forming the first touch region, each two icons of the four icons a, b, c, and d form the first touch region according to the preset rule, including 12 instances, which are ab, ac, ad, bc, bd, cd, dc, db, da, cb, ca, and ba, respectively. These 12 kinds of first touch regions each has a respective first touch region, and each has a respective second coordinate information.

Step 102: determining the second touch region on the touch control unit according to the first touch region.

Wherein, the second touch region is a region other than the first touch region on the touch control unit.

Figure 5:
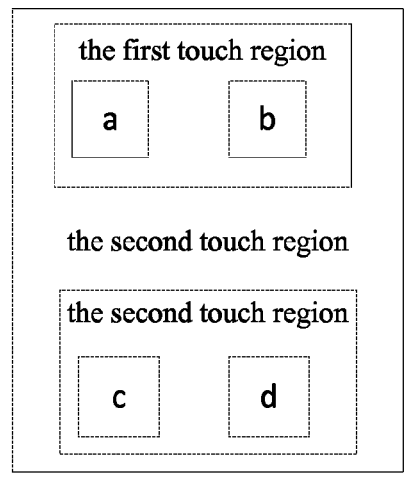
FIG. 5 is a schematic diagram of forming two first touch regions ab and cd according to the preset rule of the system on the touch control unit in the first embodiment of this application.

Taking forming two first touch regions ab and cd, according to the preset rule of the system as example. As shown in FIG. 5, ab forms the first one of the first touch region, cd forms the second one of the first touch region, and the second coordinate information of the first one of the first touch region is taking the start coordinate information of the icon a as the start coordinate information and taking the end coordinate information of icon b as the end coordinate information. The second coordinate information of the second one of the first touch region is taking the start coordinate information of the icon c as the start coordinate information and taking the end coordinate information of icon d as the end coordinate information.

The remaining region of the touch control unit other than the first touch region determined above is determined as the second touch region, and it enters into step 103.

It is to be noted that, in addition to the above-described first touch region, there are various kinds of first touch regions. For example, three of the icons form the first touch region, or all of the icons form a first touch region together, or the icons a, b, c, and d are combined arbitrarily to form the first touch region. In practice, this application does not make any limitations to what kind of first touch region is formed.

Step 103: generating a control instruction for making the touch function of the second touch region to be in the disable status.

Step 104: executing the control instruction to make the touch function of the second touch region to be in the disable status.

The above-described first embodiment describes a specific mode of forming the first touch region, as forming the first touch region, when the user clicks the icon, the electronic apparatus does not need to carry out a full screen scanning search on the touch control unit, and only carries out a scanning search in a small range in the first touch region where the icon is. Thus, the power may be saved.

The specific scanning search method of the icon is described in detail in the following.

Figure 6:
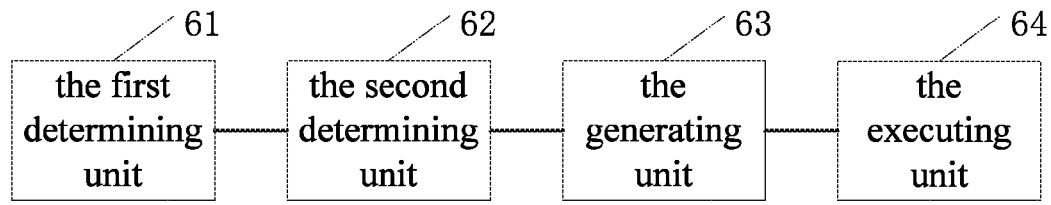
FIG. 6 is a schematic diagram of the electronic apparatus in the first embodiment of this application.

FIG. 6 further describes an electronic apparatus including a touch control unit, on which there is at least one operating icon on the touch control unit, and the electronic apparatus comprises:

A first determining unit 61 for determining a first touch region corresponding to the at least one operating icon, wherein, an area of the first touch region is less than the area of the touch control unit.

A second determining unit 62 for determining a second touch region on the touch control unit according to the first touch region, wherein, the second touch region is a region other than the first touch region on the touch control unit.

A generating unit 63 for generating a control instruction for making the touch function of the second touch region to be in the disable status.

An executing unit 64 for executing the control instruction to make the touch function of the second touch region to be in the disable status.

Figure 7:
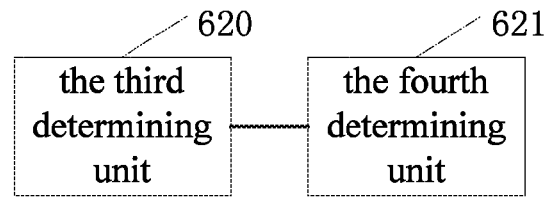
FIG. 7 is a schematic diagram of the second determining unit in the first embodiment of this application.

Further, as shown in FIG. 7, the second determining unit 62 specifically comprises:

A third determining unit 620 for determining the first coordinate information in the touch control unit corresponding to each operating icon in the at least one operating icon, wherein, the first coordinate information includes a first start coordinate information and a first end coordinate information.

A fourth determining unit 621 for determining the first touch region corresponding to the at least one operating icon, according to the first coordinate information.

Figure 8:
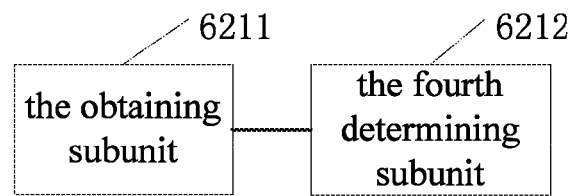
FIG. 8 is a schematic diagram of the fourth determining unit in the first embodiment of this application.

As shown in FIG. 8, the fourth determining unit 621 specifically comprises:

An obtaining unit 6211 for arranging the at least one operating icon based on a preset rule of the system of the electronic apparatus, according to the first coordinate information to obtain a second coordinate information corresponding to each operating icon in the at least one operating icon, wherein, the second coordinate information includes a second start coordinate information and a second end coordinate information.

A fourth determining subunit 6212 for determining the first touch region corresponding to the at least one operating icon according to the second coordinate information.

Second Embodiment

In the second embodiment of this application, it describes the manner how the electronic apparatus scanning searches icon from the first touch region when the user clicks the icon after the first touch region, and the second touch region are already divided in the touch control unit, and it specifically describes a control method of the electronic apparatus applied to the electronic apparatus.

Wherein, the electronic apparatus comprises a touch control unit, which includes a first touch region and a second touch region, wherein, the first touch region and the second touch region are generated by the above-described method in the first embodiment, there is at least one operating icon in the first touch region, there is a first operating icon in the at least one operating icon, and the second touch region is a region other than the first touch region on the touch control unit.

Figure 9:
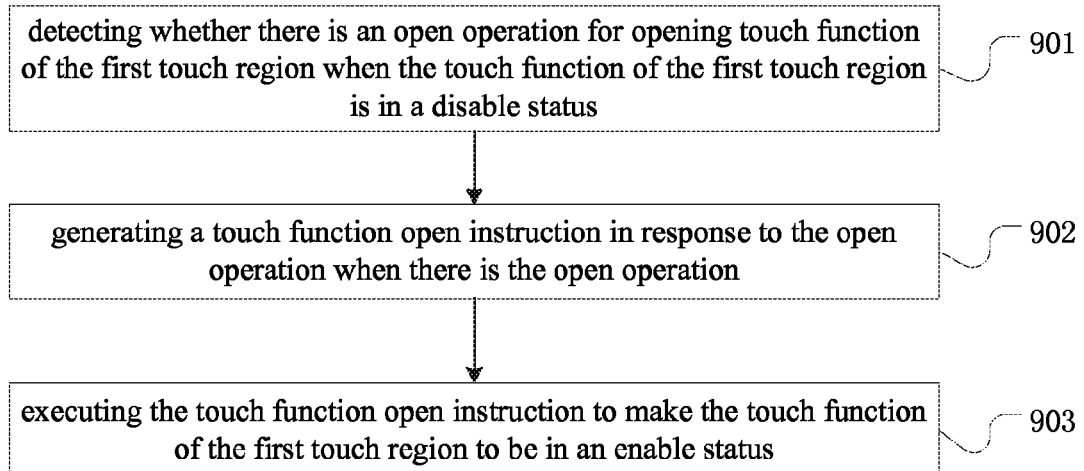
FIG. 9 is a flow chart of the control method of the electronic apparatus in the second embodiment of this application.

Referring to FIG. 9, the method comprises:

Step 901: detecting whether there is an open operation for opening the touch function of the first touch region when the touch function of the first touch region is in a disable status.

After the electronic apparatus divides the first touch region and the second touch region, the electronic apparatus closes the touch function of the second touch region, and in order to further save power, the first touch region can be made to be in the disable status when the electronic apparatus is in sleep mode for a long time.

When the user needs to click the icon, the first touch region of the electronic apparatus is firstly made to be in the enable status, and the opening has three manners as follows:

First, a key operation to the electronic apparatus is accepted in the electronic apparatus to enable the open operation of the touch function of the first touch region.

Second, a gesture operation for opening the touch function of the first touch region of the user is acquired by a camera device in the electronic apparatus or a camera device externally connected to the electronic apparatus to open the touch function in the first touch region.

Third, a voice instruction of the user is received by a voice device in the electronic apparatus to open the touch function in the first touch region.

Step 902: generating a touch function open instruction in response to the open operation when there is the open operation.

Step 903: executing the touch function open instruction to make the touch function of the first touch region to be in the enable status.

Figure 10:
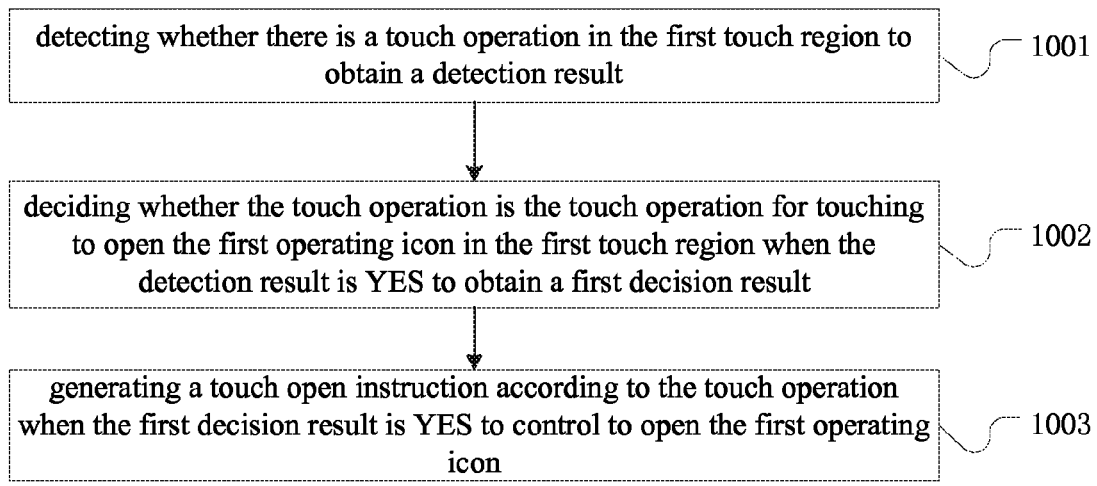
FIG. 10 is a flow chart of deciding whether the touch operation is the touch operation for touching to open the first operating icon after the first touch region being in the enable status in the second embodiment of this application.

After the first touch region is in the enable status, as shown in FIG. 10, there comprises the following steps:

Step 1001: detecting whether there is a touch operation in the first touch region to obtain a detection result.

Step 1002: deciding whether the touch operation is the touch operation for touching to open the first operating icon in the first touch region when the detection result is YES to obtain a first decision result.

Figure 11:
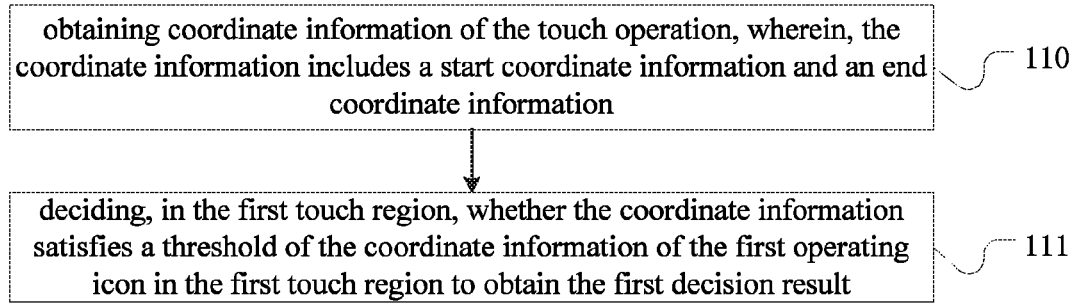
FIG. 11 is a flow chart of deciding whether the touch operation is the touch operation for touching to open the first operating icon in the second embodiment of this application.

Wherein, as shown in FIG. 11, the specific steps are as follows:

Step 110: obtaining the coordinate information of the touch operation, wherein, the coordinate information includes a start coordinate information and an end coordinate information.

Step 111: deciding, in the first touch region, whether the coordinate information satisfies a threshold of the coordinate information of the first operating icon in the first touch region to obtain the first decision result.

And the deciding whether the coordinate information satisfies the coordinate information of the first operating icon in the first touch region specifically has three manners as follows:

First, it decides whether the start coordinate information satisfies a threshold of the start coordinate information of the first operating icon in the first touch region.

Second, it decides whether the end coordinate information satisfies a threshold of the end coordinate information of the first operating icon in the first touch region.

Third, it decides whether the start coordinate information and the end coordinate information satisfy the threshold of the start coordinate information of the first operating icon in the first touch region and the threshold of the end coordinate information of the first operating icon in the first touch region, respectively.

In the second embodiment of this application, it describes the above method in detail by example.

Figure 12:
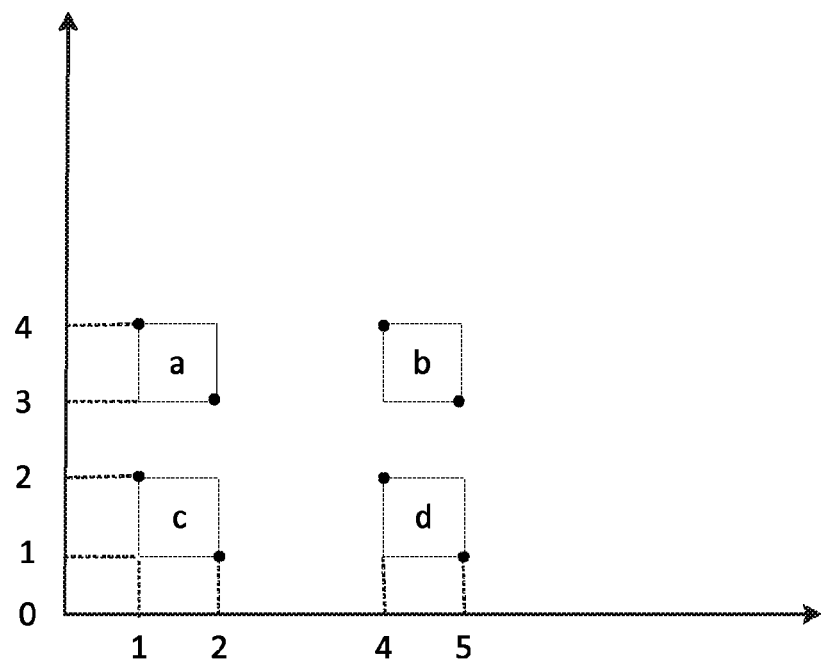
FIG. 12 is a schematic diagram of the coordinate information of the four icons in the second embodiment of this application.

By taking each icon forming a first touch region as example, as shown in FIG. 4, the four icons a, b, c, and d in FIG. 4 form the first touch region separately, and the four icons have coordinate information as shown in FIG. 12:

The coordinate information of icon a:
Start coordinate information: (1,4); end coordinate information: (2,3).
The coordinate information of icon b:
Start coordinate information: (4,4); end coordinate information: (5,3).
The coordinate information of icon c:
Start coordinate information: (1,2); end coordinate information: (2,1).
The coordinate information of icon d:
Start coordinate information: (4,2); end coordinate information: (5,1).

When there are these four first touch regions, if the user wants to open the function of the icon a, he will click the icon a, that is, the electronic apparatus would detect the touch operation in the first touch region.

In addition, the touch operation has the coordinate information including the start coordinate information and the end coordinate information.

It be seen from FIG. 12, icon a forms an icon whose area is 1, therefore, when the user clicks the icon a, if the region clicked by the finger of the user is within the range of the area of the icon a, it decides that the coordinate information of the touch operation of the user can satisfy the threshold of the coordinate information of the icon a in the first touch region, and it is capable of opening the function of the icon a.

And if the area of the region clicked by the finger of the user is larger than the range of the area of the icon a, for example, the coordinate information of the touch operation of the user may use:

A first kind of touch operation, the start coordinate information (0.5,3.5), the end coordinate information: (2,3).

A second kind of touch operation, the start coordinate information (1,4), the end coordinate information: (2.5, 2.5).

A third kind of touch operation, the start coordinate information (0.5,3.5), the end coordinate information: (2.5, 2.5).

There are three manners corresponding to satisfying the above-described three kinds of thresholds of the coordinate information of the first operating icon in the first touch region.

For example, the threshold of the start coordinate information and the threshold of the end coordinate information of the icon a can be set to 0.5, that is, icon a can be clicked within an error of 0.5.

Figure 13:
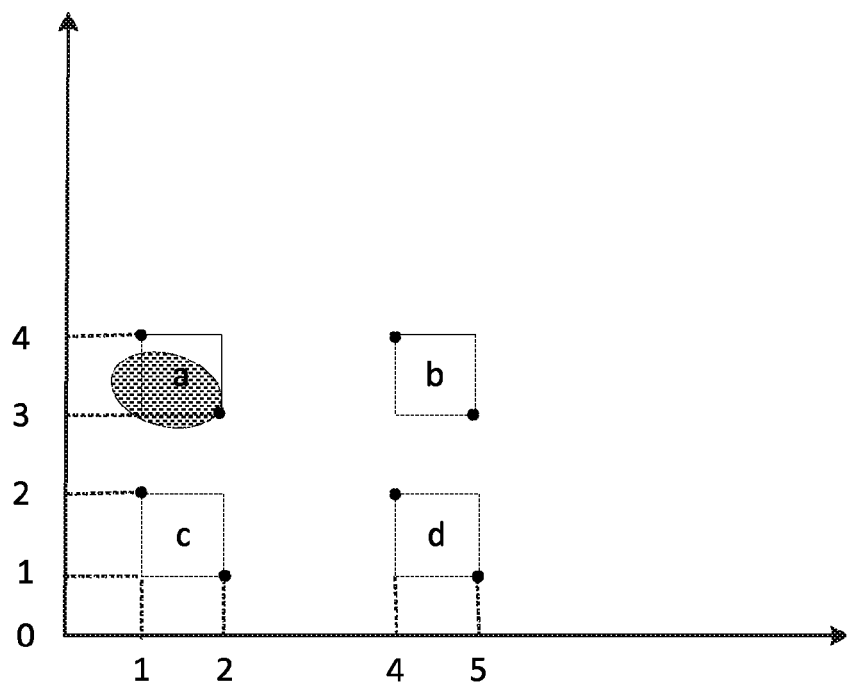
FIG. 13 is a schematic diagram of a user clicking the icon a in the second embodiment of this application.

Therefore, when there forms a first kind of touch operation when the user uses finger to click icon a, since the start coordinate information of the first kind of touch operation is (0.5, 3.5), and the end coordinate information is (2,3), it can be seen from FIG. 13 that, though a part of the region clicked by the user is outside the range of the area of icon a, the icon a can be clicked to open the function of the icon a.

Figure 14:
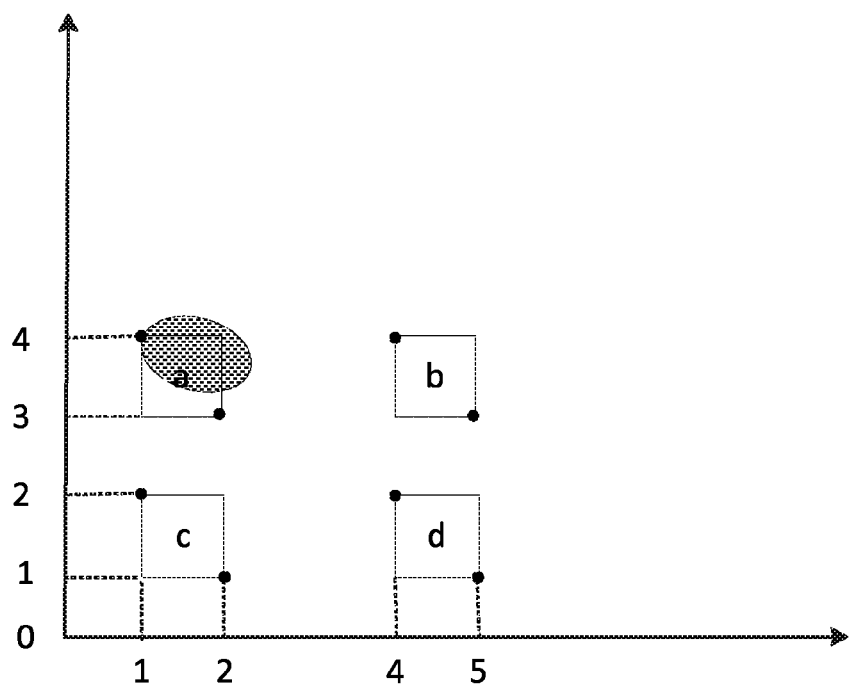
FIG. 14 is another schematic diagram of the user clicking the icon a in the second embodiment of this application.

When there forms a second kind of touch operation when the user uses finger to click the icon a, since the start coordinate information of the second kind of touch operation is (1, 4), and the end coordinate information is (2.5, 2.5), it can be seen from FIG. 14 that, though a part of the region clicked by the user is outside the range of the area of icon a, the icon a can be clicked to open the function of the icon a.

Figure 15:
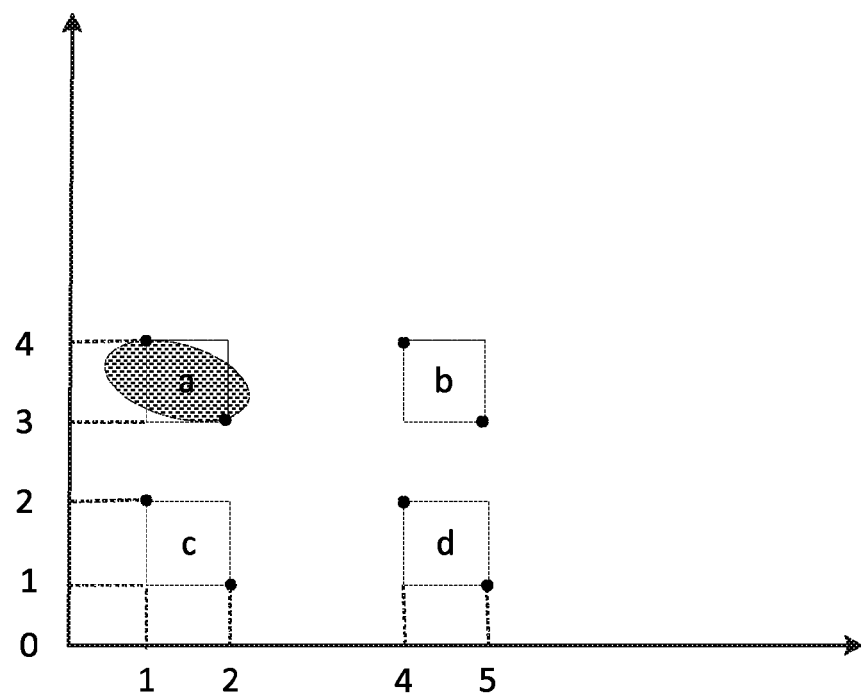
FIG. 15 is yet another schematic diagram of the user clicking the icon a in the second embodiment of this application.

Since the start coordinate information of the third kind of touch operation is (0.5, 3.5), the end coordinate information is (2.5, 2.5), it can be seen from FIG. 15 that, though a part of the region clicked by the user is outside the range of the area of the icon a, the icon a can be clicked to open the function of the icon a.

In practice, the threshold of the coordinate information of the first operating icon can be set according to practical situation, and this application does not make any limitation thereto.

Therefore, it can be seen from the above three kinds of instances that, the coordinate information of the touch operation that user clicks the icon a satisfies the threshold of the coordinate information of the icon a in the first touch region, i.e., the first decision result is YES, thus it enters into step 1003.

Step 1003: generating a touch open instruction according to the touch operation when the first decision result is YES to control to open the first operating icon.

In addition to this, the electronic apparatus may also set a threshold, and when the time that the user does not use the electronic apparatus reaches a certain threshold, the touch function of the first touch region is closed to make the first touch region to be in the disable status to further save power.

In the second embodiment of this application, since it carries out the partition operation to the electronic apparatus, the user can carry out a scanning search in the first touch region of a small range where the icon is when the user clicks the icon to avoid the full screen scanning search of the touch control unit of the electronic apparatus, capable of power saving.

Figure 16:
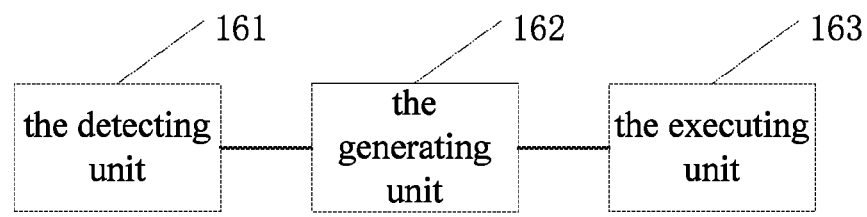
FIG. 16 is a schematic diagram of the electronic apparatus in the second embodiment of this application.

In the second embodiment of this application, as shown in FIG. 16, it further describes an electronic apparatus including a touch control unit, which includes a first touch region and a second touch region, wherein, the first touch region and the second touch region are generated by the above-described method in the first embodiment, at least one operating icon is included in the first touch region. There is a first operating icon in the at least one operating icon, and the second touch region is a region other than the first touch region on the touch control unit, and the electronic apparatus comprises:

A detecting unit 161 for detecting whether there is an open operation for opening the touch function of the at least one touch region when the touch function of the first touch region is in a disable status.

A generating unit 162 for generating a touch function open instruction in response to an open operation when there is the open operation.

An executing unit 163 for executing the touch function open instruction to make the touch function of the first touch region to be in the enable status.

Figure 17:
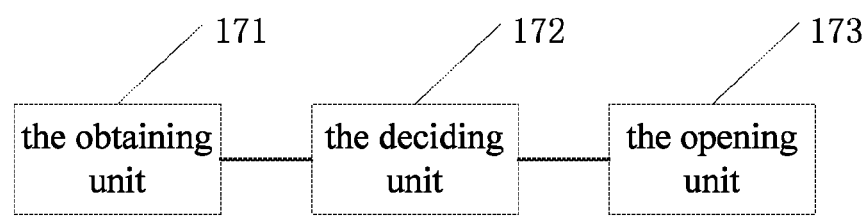
FIG. 17 is another schematic diagram of the electronic apparatus in the second embodiment of this application.

Further, as shown in FIG. 17, the electronic apparatus further comprises:

An obtaining unit 171 for detecting whether there is a touch operation in the first touch region to obtain a detection result.

A deciding unit 172 for deciding whether the touch operation is the touch operation for touching to open the first operating icon in the first touch region when the detection result is YES to obtain a first decision result.

An opening unit 173 for generating a touch open instruction, according to the touch operation when the first decision result is YES, to control to open the first operating icon.

Figure 18:
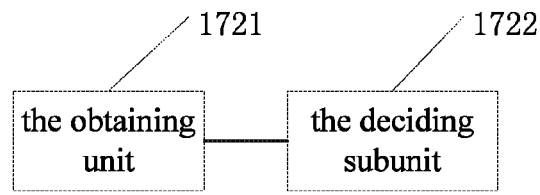
FIG. 18 is a schematic diagram of the deciding unit in the second embodiment of this application.

Further, as shown in FIG. 18, the deciding unit 172 specifically comprises:

An obtaining unit 1721 for obtaining the coordinate information of the touch operation, wherein, the coordinate information includes a start coordinate information and an end coordinate information.

A deciding subunit 1722 for deciding, in the first touch region, whether the coordinate information satisfies a threshold of the coordinate information of the first operating icon in the first touch region to obtain the first decision result.

Figure 19:
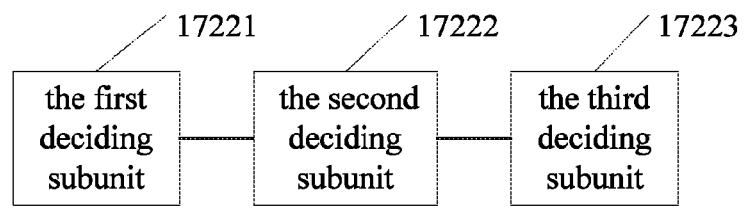
FIG. 19 is a schematic diagram of the deciding subunit in the second embodiment of this application.

As shown in FIG. 19, the deciding subunit 1722 specifically comprises:

A first deciding subunit 17221 for deciding whether the start coordinate information satisfies a threshold of the start coordinate information of the first operating icon in the first touch region, or A second deciding subunit 17222 for deciding whether the end coordinate information satisfies a threshold of the end coordinate information of the first operating icon in the first touch region, or A third deciding subunit 17223 for deciding whether the start coordinate information and the end coordinate information satisfy the threshold of the start coordinate information of the first operating icon in the first touch region and the threshold of the end coordinate information of the first operating icon in the first touch region respectively.

With one or more embodiments of the present invention, the following technical effect can be achieved:

In this application, with one or more embodiments, by providing a control method of an electronic apparatus to carry out a partition operation to the touch region in the touch control unit of the electronic apparatus and close unused touch function of the touch control unit, it achieves a purpose of saving power.

Further, since the icons are in a region having touch function in the electronic apparatus, when the user clicks the icon, only a scanning search is carried out in the region having touch function without a search in full screen, therefore, it achieves a purpose of saving power.

Further, when the first touch control unit is not used, it is made to be in a disable status, which further achieves a purpose of saving power.

As described in the above, in the first embodiment and the second embodiment of the invention, the touch control unit (for example, a touch control display screen, a touch control panel, and so on which are also called touch screen) is divided into a plurality of regions, and, when the touch control unit is in a working status, it carries out scanning detection to the plurality of touch regions to determine the accurate touch region.

However, the applicant finds that in the procedure of implementing the technical solution of the above embodiments of this application, there are at least the following technical problems:

Since when the touch control unit is in the working status, it needs to carry out scanning detection to a plurality of touch regions, so that the power consumption is likely to be relatively large.

Therefore, the third embodiment of the invention further provides a control method and an electronic apparatus for solving the technical problem that the power consumption of the electronic apparatus is relatively large in the prior art.

On the one hand, this application provides the following technical solution according to the third embodiment of this application:

A control method applied in an electronic apparatus comprising a touch control unit, which includes at least a first touch control layer and a second touch control layer, is provided, wherein the first power consumption corresponding to the first touch control layer is less than the second power consumption corresponding to the second touch control layer, and the method comprises:

Detecting whether a first distance between the touch control unit and a first object is larger than a first preset threshold to obtain a detection result;

Controlling the first touch control layer to be in working status and the second touch control layer to be in non-working status, if the detection result indicates the first distance is larger than the first preset threshold; and Controlling only the second touch control layer to be in working status if the detection result indicates the first distance is less than the preset threshold.

Further, detecting whether the first distance between the touch control unit and the first object is larger than the first preset threshold specifically comprises:

Detecting by the first touch control layer to obtain the first distance between the touch control unit and the first object; and Deciding whether the first distance is larger than the first preset threshold.

Further, detecting to obtain the first distance between the touch control unit and the first object specifically comprises:

Detecting whether there is a first operation at the first active touch point of the electronic apparatus;

Generating a first control instruction when there is the first operation at the first active touch point; and Detecting the first distance between the touch control unit and the first object by the first touch control layer based on the first control instruction.

Further, when the electronic apparatus has a third touch control layer and wherein the third power consumption corresponding to the third touch control layer is larger than the second power consumption, after controlling only the second touch control layer to be in working status if it is less than the preset threshold, the method further comprises:

Detecting whether the first distance is larger than the second preset threshold based on the second touch control layer;

Controlling only the second touch control layer to be in working status when the first distance is larger than the second preset threshold;

Controlling only the third touch control layer to be in working status when the first distance is less than the third preset threshold.

On the other hand, this application provides the following technical solution according to the third embodiment of the present invention:

An electronic apparatus comprises:

A shell;

A touch control unit provided on the surface of the shell; the touch control unit specifically includes a first touch control layer and a second touch control layer, wherein, a first power consumption corresponding to the first touch control layer is less than a second power consumption corresponding to the second touch control layer;

A detecting unit connected to the touch control unit for detecting whether a first distance between the touch control unit and a first object is larger than a first preset threshold;

A control unit connected to the detecting unit for controlling the first touch control layer to be in working status, and the second touch control layer to be in non-working status if the detection result indicates that the first distance is larger than the first preset threshold; and controlling only the second touch control layer to be in working status if the detection result indicates that the first distance is less than the preset threshold.

Further, the touch control unit is specifically a capacitive screen.

Further, the first touch control layer comprises N first touch control sub-pieces; the second touch control layer comprises M second touch control sub-pieces, where M is an integer which is greater than or equal to 1, and N is an integer which is larger than M.

Further, the detecting unit is specifically the first touch control layer.

Further, the electronic apparatus further comprises:

A first active touch point provided on the surface of the shell, and a first control instruction is generated when there is the first operation at the first active touch point.

Further, the detecting unit is specifically for:

Detecting the first distance between the touch control unit and the first object based on the first control instruction.

Further, the electronic apparatus further comprises:

A third touch control layer, wherein, a third power consumption corresponding to the third touch control layer is larger than the second power consumption.

Further, the second touch control layer is also for:

Detecting whether the first distance is larger than a second preset threshold;

The control unit is also for controlling only the second touch control layer to be in working status when the first distance is larger than the second preset threshold; and Controlling only the third touch control layer to be in working status when the first distance is less than the third preset threshold.

One or more technical solutions provided by the third embodiment of this application at least have the following technical effects or advantages.

(1) Since in the embodiment of this application, the working status of the touch control unit is controlled by at least two touch control layers, wherein, only the first touch control layer having lower power consumption is controlled to be in working status when the distance between the touch control unit and the first object is larger than the first preset threshold, the second touch control layer having higher power consumption is controlled to be in working status only when the distance is less than the first preset threshold. Thus, the technical effect of saving power consumption is achieved while ensuring the accuracy of the detection of the touch control unit.

(2) Since in the embodiment of this application, the first distance between the touch control unit and the first object can be detected by the first touch control layer, it is not necessary to add a new detecting module to achieve the technical effect of convenient operation and saving resource;

(3) Since in the embodiment of this application, the first distance is detected in various detection modes, a second kind of detection mode, for example, detecting the first distance by a distance sensor can be employed in case that the first kind of detection mode, for example, detecting based on the first touch control layer fails to achieve the technical effect of increasing the success ratio and accuracy of the detection;

(4) Since in the embodiment of this application, whether the first distance is larger than the first preset threshold is detected when the first active touch point is triggered, the first touch control layer can keep the non-working status to further achieve the technical effect of saving power consumption;

(5) Since in the embodiment of this application, the touch control unit may comprise a plurality of touch control layers, and the touch control layer corresponding to a preset distance range is opened every time of reaching the preset distance range to achieve technical effect of more accurate detection and further saving power consumption.

The third embodiment of this application solves the technical problem of too large power consumption of the electronic apparatus in the prior art by providing a control method and an electronic apparatus, to achieve the technical effect of saving power consumption effectively.

The technical solution in the third embodiment of this application has a general concept as follows for solving the above problem:

Providing a plurality of touch control layers such as a first touch control layer, a second touch control layer, a third touch control layer, and so on to the touch control unit of the electronic apparatus, wherein, the power consumption of the first touch control layer is the least, the power consumption of the second touch control layer is the second least, and the power consumption of the third touch control layer is the most;

Then detecting the first distance between the first object and the touch control unit;

Controlling only touch control layer having low power consumption to be in working status when the first distance is a farther distance and controlling only the touch control layer having high power consumption to be in working status when the first distance is a nearer distance, so that the technical effect of saving power consumption is achieved in case of ensuring the accuracy of the detection of the touch control unit.

In order to understand the above-described technical solution better, the above-described technical solution is described in detail by combining FIGS. 20-25 and the description of embodiments.

The third embodiment of this application provides a control method applied in the electronic apparatus including the touch control unit, the electronic apparatus may be mobile phone, pad, all-in-one PC, and so on, this application does not make any limitation to what kinds of apparatus the electronic apparatus is in the specific implementation procedure.

Figure 20:
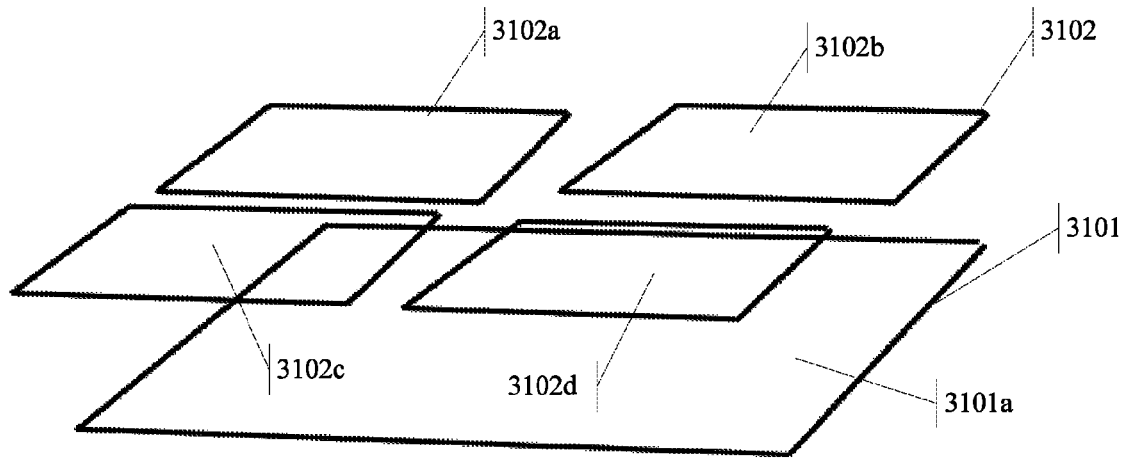
FIG. 20 is a structural diagram of the touch control unit in the third embodiment of this application.

As shown in FIG. 20, the touch control unit at least comprises the following structure:

A first touch control layer 3101;

A second touch control layer 3102, wherein, the first power consumption corresponding to the first touch control layer is less than the second power consumption corresponding to the second touch control layer.

In the specific implementation procedure, the touch control unit may be a capacitive screen, the first touch control layer 3101 comprises M first touch control sub-pieces, such as 3101a in FIG. 20, the second touch control layer 3102 comprises N second touch control sub-pieces, such as 3102a, 3102b, 3102c, and 3102d in FIG. 20, wherein, M is an integer that is greater than or equal to 1, and N is an integer that is larger than M.

In the specific implementation procedure, this application does not make any limitation to the values of M and N, as long as the value of N is less than the value of M.

Figure 21:
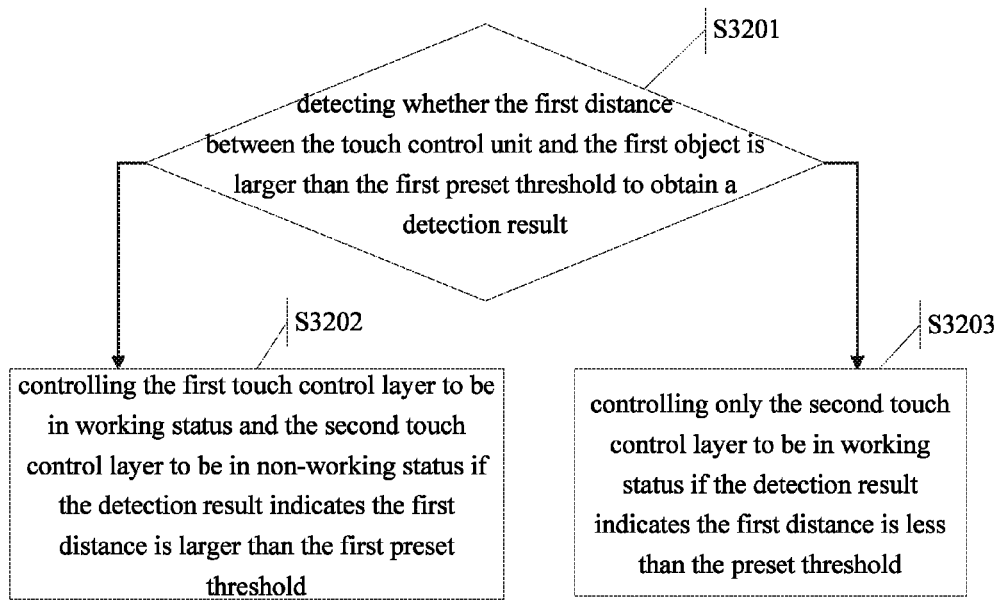
FIG. 21 is a flow chart of the control method in the third embodiment of this application.

As shown in FIG. 21, the method comprises the following steps:

S3201: detecting whether the first distance between the touch control unit and the first object is larger than the first preset threshold to obtain a detection result;

In the specific implementation procedure, whether the first distance is larger than the first preset threshold can be detected by various means, among which two kinds of detecting means will be listed and described as follows, of course, it does not limited to the following instances in the specific implementation procedure.

Figure 22:
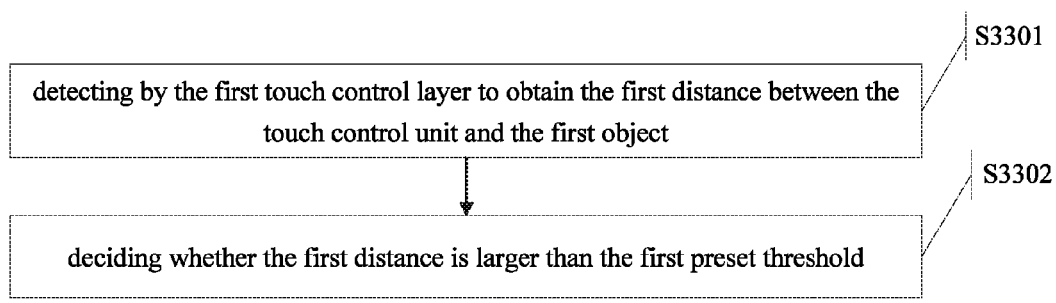
FIG. 22 is a flow chart of detecting whether the first distance is larger than the first preset threshold by the first touch control layer in the third embodiment of this application.

First, detecting by using the first touch control layer directly, as shown in FIG. 22, including the following step:

S3301: detecting by the first touch control layer to obtain the first distance between the touch control unit and the first object;

In the specific implementation procedure, the first touch control layer corresponds to a proximity sensor, and when the first object approaches the touch control unit, the first touch control layer can detect the capacitance between the touch control unit and the first object, for example: $2.21*10^{-13}$ F;

Then, based on the computing formula of the capacitance: $C=\in*\in_0*S/d$, $d=\in*\in_0*S/C$ can be derived to further obtain the first distance, Where $\in$ is a relative dielectric constant, wherein, the value $\in$ of air is: 1.000585;

$\in_0$ is a vacuum dielectric constant, which is specifically: $8.86*10^{-12}$ F/m;

S is an area ratio of the two interfaces, it assumes the area ratio between the first object and the touch control unit is 0.01 $m^2$.

Then the first distance d is derived as 0.1 m.

The step S3302 can be executed after obtaining the first distance based on the step S3301, the step S3302 is deciding whether the first distance is larger than the first preset threshold.

In the specific implementation procedure, different first preset thresholds can be set based on different application scenes. For example, if it wishes to start the scanning of the touch control layer having higher power consumption when the distance is near, then the first preset threshold is set smaller, for example, 0.05 m, of course it can be other value; and if the first preset threshold is 0.05 m, then the detection result obtained indicates that the first distance is larger than the first preset threshold;

If it wishes to start the scanning of the touch control layer having higher power consumption when the distance is far, then the first preset threshold is set larger, for example, 0.2 m, of course it can be other value. If the first preset threshold is 0.2 m, the detection result obtained indicates that the first distance is less than the first preset threshold.

Of course, this application does not make any limitation to what value the first preset threshold is in the specific implementation procedure.

It is understood from the above description that, since in the third embodiment of this application, the first distance between the touch control unit and the first object can be detected by the first touch control layer directly, it is not necessary to add a new detecting module, so as to achieve the technical effect of convenient operation and saving resource.

Second, a distance sensor is provided on the electronic apparatus, the first distance is detected based on the distance sensor, and then whether the first distance is larger than the first preset threshold is decided.

In some instances, there may be failure in the detection of the distance by the first touch control layer, resulting in error in the detected data, and even the detection can't be carried out, so for the sake of assurance, a distance sensor for detecting the first distance may further be provided on the electronic apparatus to detect the first distance.

In the specific implementation procedure, a light pulse that is particularly short may be transmitted through the distance sensor, and the time from the moment the light pulse is transmitted to the moment that it is reflected back by the first object is measured, then the first distance is computed based on this time.

It is understood from the above description that, since in the third embodiment of this application, the first distance is detected in various detection modes, a second kind of detection mode, for example, detecting the first distance by a distance sensor can be employed in case that the first kind of detection mode, for example, detecting based on the first touch control layer fails, so as to achieve the technical effect of increasing the success ratio and accuracy of the detection.

Figure 23:
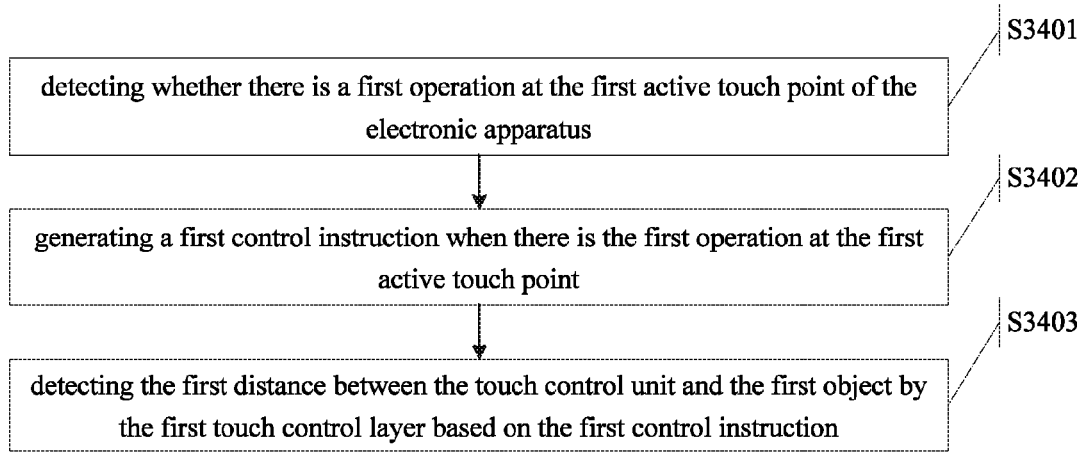
FIG. 23 is a flow chart of triggering the detection procedure in the third embodiment of this application.

In the specific implementation procedure, before detecting to obtain the first distance between the touch control unit and the first object, as shown in FIG. 23, it may also carry out the following operation:

S3401: detecting whether there is a first operation at a first active touch point of the electronic apparatus;

In the specific implementation procedure, the first operation may be an arbitrarily preset operation, for example, the operation of double clicking the active touch point, the operation of single click, the operation of long press and so on, this application does not make any limitation to what kind of operation the first operation is.

The step S3402 can be executed after checking whether there is the first operation based on the step S3401. The step S3402 is generating a first control instruction when there is the first operation at the first active touch point;

The step S3403 can be executed after obtaining the first control instruction based on step S3402, the step S3403 is detecting the first distance between the touch control unit and the first object by the first touch control layer or the distance sensor based on the first control instruction.

It is understood from the above description that, since in the third embodiment of this application, whether the first distance is larger than the first preset threshold is detected when the first active touch point is triggered, the first touch control layer can keep the non-working status at the time that there is no trigger, so as to further achieve the technical effect of saving power consumption.

The step S3202 can be executed after obtaining a detection result based on the step S3201, the step S3202 is controlling the first touch control layer to be in working status, and the second touch control layer to be in non-working status if the detection result indicates that the first distance is larger than the first preset threshold;

It can be known based on the detection result in the step S3201 that, if the first preset threshold is 0.05 m, the detection result indicates that the first distance is larger than the first preset threshold, and thus, in order to scan the distance continuously, the first touch control layer 3201 is controlled to be in working status, and in order to save power consumption, the second touch control layer 3202 is controlled to be in non-working status.

The step S3203 can be executed after obtaining a detection result based on the step S3201. The step S3203 is controlling only the second touch control layer to be in working status if the detection result indicates that the first distance is less than the preset threshold.

It can be known based on the detection result of the step S3201 that if the first preset threshold is 0.2 m, the detection result indicates that the first distance is less than the first preset threshold. Thus, in order to carry out a more accurate detection to the touch control operation on the surface of the touch control unit, the scanning function of the second touch control layer 3202 is opened, and the scanning function of the first touch control layer 3201 is closed.

Moreover, it is understood from the above description that, since in the third embodiment of this application, the working status of the touch control unit is controlled by at least two touch control layers, wherein only the first touch control layer having lower power consumption is controlled to be in working status when the distance between the touch control unit and the first object is larger than the first preset threshold, the second touch control layer having higher power consumption is controlled to be in working status only when the distance is less than the first preset threshold. Thus, the technical effect of saving power consumption is achieved while ensuring the accuracy of the detection of the touch control unit.

Further, in the third embodiment of this application, the touch control unit comprises a third touch control layer besides the first touch control layer 3101 and the second touch control layer 3102, wherein a third power consumption corresponding to the third touch control layer is larger than the second power consumption.

Figure 24:
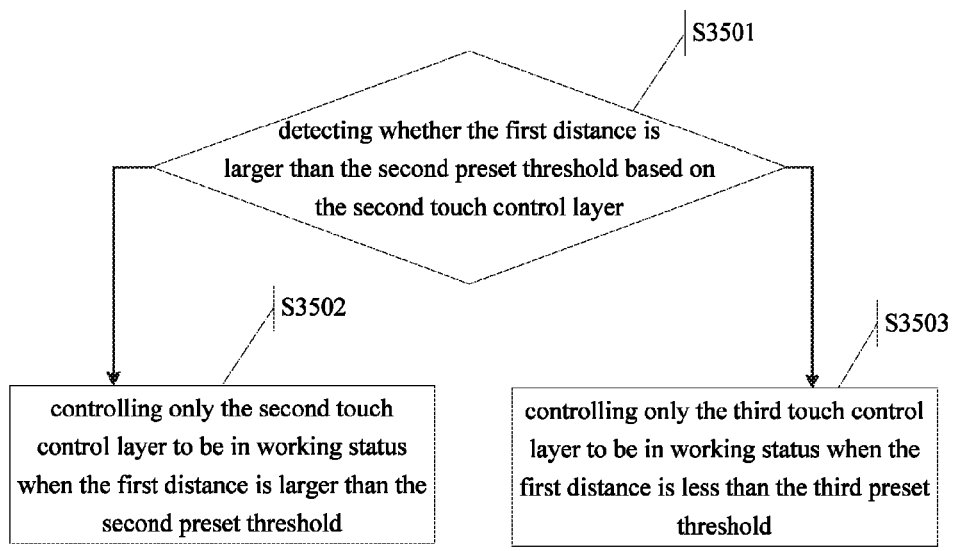
FIG. 24 is a further flow chart of the control method when the electronic apparatus includes a third touch control layer in the third embodiment of this application.

Then, after controlling only the second touch control layer to be in working status based on the step S3203, as shown in FIG. 24, the method may further comprise the following step:

S3501: detecting whether the first distance is larger than a second preset threshold based on the second touch control layer.

In particular, a plurality of touch control layers with power consumption varying from less to more are provided and each touch control layer corresponds to a preset threshold, for example:

| Touch control layer | Preset threshold (m) | Power consumption (W) |
|---|---|---|
| First touch control layer | 0.5~0.2 | 1 |
| Second touch control layer | 0.2~0.08 | 4 |
| Third touch control layer | 0.08~0 | 16 |

Since the first distance obtained based on the step S3201 is 0.1 m, then the second touch control layer is made to be in working status, and the first touch control layer and the third touch control layer are in non-working status.

However, in the specific implementation procedure, when the user carries out the touch control operation, the distance between the first object and the surface of the touch control unit becomes closer and closer. It assumes that the capacitance value detected is $1.1*10-13$ F at a certain time.

Then the first distance d obtained based on the previous distance computing formula is 0.052 m.

It can be seen that the first distance is less than the second preset threshold.

Step S3502 can be executed after detecting whether the first distance is larger than the second preset threshold based on step S3501. Step S3502 is controlling only the second touch control layer to be in working status when the first distance is larger than the second preset threshold.

Step S3503 can be executed after detecting whether the first distance is less than the second preset threshold based on step S3501. Step S3503 is controlling only the third touch control layer to be in working status when the first distance is less than the second preset threshold.

Since it can be known based on the detection result of step S3501 that the first distance is 0.052 m, which is less than the second preset threshold of 0.08 m but falls into the range of the third preset threshold 0.08~0, it indicates that the distance between the first object and the surface of the touch control unit is very close. In order to increase the scanning accuracy of the touch control unit, the scanning function of the second touch control layer is closed, and the scanning function of the third touch control layer is opened to make the third touch control layer to be in working status.

It can be understood from the above description that, in the third embodiment of this application, the touch control unit may comprise a plurality of touch control layers, and the touch control layer corresponding to a preset distance range is opened every time it reaches the preset distance range to achieve the technical effect of more accurate detection and further saving power consumption.

The third embodiment of this application further provides an electronic apparatus, which is the electronic apparatus employed when the control method in the third embodiment of this application is implemented. The electronic apparatus may be a mobile phone, pad, all-in-one PC, and so on. This application does not make any limitation to what kind of apparatus the electronic apparatus is.

Figure 25:
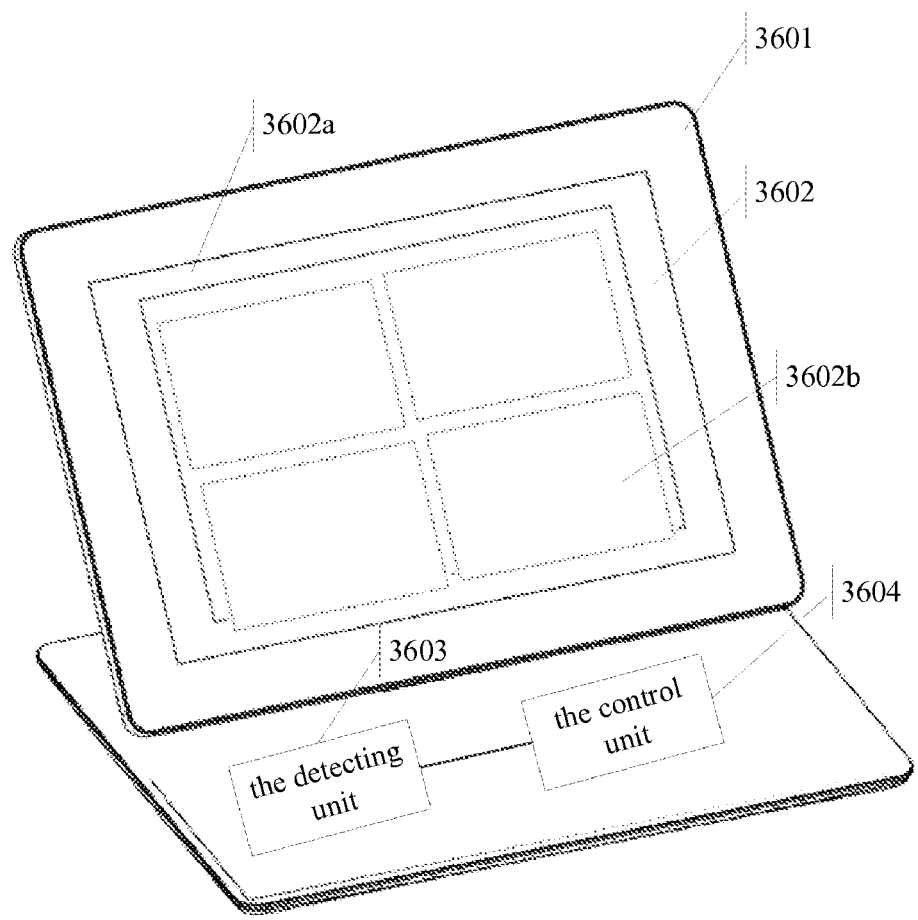
FIG. 25 is a structural diagram of the electronic apparatus in the third embodiment of this application.

As shown in FIG. 25, the electronic apparatus comprises the following structure:

A shell 3601;

A touch control unit 3602 provided on the surface of the shell 3601, the touch control unit 3602 specifically comprises a first touch control layer 3602a and a second touch control layer 3602b, wherein a first power consumption corresponding to the first touch control layer 3602a is less than a second power consumption corresponding to the second touch control layer 3602b;

In the specific implementation procedure, the first touch control layer 3602 may be a capacitive screen, and the first touch control layer 3602a comprises N first touch control sub-pieces; the second touch control layer 3602b comprises M second touch control sub-pieces, where M is an integer that is greater than or equal to 1, and N is an integer that is larger than M. In the specific implementation procedure, this application does not make any limitation to the value of M and N, as long as the value of N is less than the value of M.

A detecting unit 3603 connected to the touch control unit 3602 for detecting whether a first distance between the touch control unit and a first object is larger than a first preset threshold;

In the specific implementation procedure, the detecting unit 3603 may be composed of various functional modules, of which two kinds are described in the following. The detecting unit 3603 is not limited to the following two kinds of instances in the specific implementation procedure.

First, the detecting unit 3603 is the first touch control layer 3602a. Then, the first touch control layer 3602a is specifically for:

Detecting to obtain the first distance between the touch control unit and the first object, and deciding whether the first distance is larger than the first preset threshold.

Since in the part of describing the control method, this application describes in detail how to detect the first distance based on the first touch control layer 3602a, it would not be described here to avoid redundancy.

It is understood from the above description that in the third embodiment of this application, the first distance between the touch control unit and the first object can be detected by the first touch control layer directly. It is not necessary to add a new detecting module to achieve the technical effect of convenient operation and saving resource.

Second, the detecting unit 3603 is a distance sensor provided on the electronic apparatus. The first distance is detected based on the distance sensor. Then, it is decided whether the first distance is larger than the first preset threshold.

In the specific implementation procedure, a light pulse that is particularly short may be transmitted through the distance sensor, and the time from the moment the light pulse is transmitted to the moment that it is reflected back by the first object is measured. Then, the first distance is computed based on this time.

It is understood from the above description that in the third embodiment of this application, the first distance is detected in various detection modes. A second kind of detection mode, for example, detecting the first distance by a distance sensor can be employed in case that the first kind of detection mode, for example, detecting based on the first touch control layer, fails to achieve the technical effect of increasing the success ratio and accuracy of the detection.

In the specific implementation procedure, the electronic apparatus may also comprise:

A first active touch point provided on the surface of the shell 3601, and a first control instruction is generated when there is a first operation at the first active touch point.

In the specific implementation procedure, the first operation may be an arbitrarily preset operation, for example, the operation of double clicking the active touch point, the operation of single click, the operation of long press, and so on. This application does not make any limitations to what kind of operation the first operation is.

In the specific implementation procedure, the detecting unit 3602 can be triggered to enter into the working status after a first control instruction is generated when there is a first operation at the first active touch point. That is, the first touch control layer 3602a or the distance sensor are triggered to detect the first distance between the touch control unit 3602 and the first object.

It is understood from the above description that in the third embodiment of this application, whether the first distance is larger than the first preset threshold is detected when the first active touch point is triggered, the first touch control layer can keep the non-working status at the time that there is no trigger to further achieve the technical effect of saving power consumption.

A control unit 3604 connected to the detecting unit 3603 for controlling the first touch control layer to be in working status and the second touch control layer to be in non-working status if the detection result indicates that the first distance is larger than the first preset threshold, and controlling only the second touch control layer to be in working status if the detection result indicates that the first distance is less than the preset threshold.

It is understood from the above description that in the third embodiment of this application, the working status of the touch control unit is controlled by at least two touch control layers, wherein only the first touch control layer having lower power consumption is controlled to be in working status when the distance between the touch control unit and the first object is larger than the first preset threshold, the second touch control layer having higher power consumption is controlled to be in working status only when the distance is less than the first preset threshold, thus, the technical effect of saving power consumption is achieved while ensuring the accuracy of the detection of the touch control unit.

Further, in the specific implementation procedure, the touch control unit 3602 may also comprise a third touch control layer in addition to the first touch control layer 3602a and the second touch control layer 3602b, wherein a third power consumption corresponding to the third touch control layer is larger than the second power consumption.

In such case, the second touch control layer 3602b is also for:

Detecting whether the first distance is larger than a second preset threshold;

The control unit 3603 is also for controlling only the second touch control layer to be in working status when the first distance is larger than the second preset threshold; and Controlling only the third touch control layer to be in working status when the first distance is less than the second preset threshold.

In particular, a plurality of touch control layers is provided with power consumption varying from less to more, each touch control layer corresponds to a preset threshold range, and in the specific implementation procedure, if the user carries out the touch control operation, the first distance from the touch control unit 3602 is closer and closer, and if the first distance falls into the threshold range of the first touch control layer 3602a, only the first touch control layer 3602a is made to be in working status, and so on.

It can be understood from the above description that in the third embodiment of this application, the touch control unit may comprise a plurality of touch control layers, and the touch control layer corresponding to a preset distance range is opened every time of reaching the preset distance range to achieve technical effect of more accurate detection and further saving power consumption.

Since the above-described electronic apparatus is the electronic apparatus employed when the control method in the third embodiment of this application is implemented, those skilled in the art can understand the detailed implementation mode and various modification and variation of the electronic apparatus of the third embodiment of this application based on the control method in the third embodiment of this application, so the electronic apparatus is not described in detail here. The electronic apparatuses employed by those skilled in the art to implement the method of the embodiment of this application all fall into the scope sought for protection of this application.

One or more technical solutions provided by the third embodiment of this application at least have the following technical effects or advantages:

(1) Since in the third embodiment of this application, the working status of the touch control unit is controlled by at least two touch control layers, wherein only the first touch control layer having lower power consumption is controlled to be in working status when the distance between the touch control unit and the first object, the second touch control layer having higher power consumption is controlled to be in working status only when the distance is less than the first preset threshold, thus, the technical effect of saving power consumption is achieved while ensuring the accuracy of the detection of the touch control unit;

(2) Since in the third embodiment of this application, the first distance between the touch control unit and the first object can be detected by the first touch control layer, it is not necessary to add a new detecting module to achieve the technical effect of convenient operation and saving resource.

(3) Since in the third embodiment of this application, the first distance is detected in various detection modes, a second kind of detection mode, for example, detecting the first distance by a distance sensor can be employed in case that the first kind of detection mode, for example, detecting based on the first touch control layer fails, so as to achieve the technical effect of increasing the success ratio and accuracy of the detection.

(4) Since in the third embodiment of this application, whether the first distance is larger than the first preset threshold is detected when the first active touch point is triggered, the first touch control layer can keep the non-working status to further achieve the technical effect of saving power consumption;

(5) Since in the third embodiment of this application, the touch control unit may comprise a plurality of touch control layers, and the touch control layer corresponding to a preset distance range is opened every time of reaching the preset distance range to achieve technical effect of more accurate detection and further saving power consumption.

As above mentioned, as the application of the portable electronic apparatus becomes more and more popular, the portable electronic apparatus is generally equipped with a touch control unit. The user implements the manipulation of the portable electronic apparatus, such as webpage browsing and game playing or the like by operating on the touch control unit.

A plurality of musical instrument playing software such as guitar, piano, shelf drum or the like used on the portable electronic apparatus are provided to play the musical instruments on the portable electronic apparatus. The musical instrument playing software output corresponding tone of the musical instrument by detecting the operation of the user on the touch control unit.

For example, the capacitive screen drive IC (Integrated Circuit) on the current portable electronic apparatus detects the contact point of the user on the touch control unit through progressive scanning by taking the entire capacitive screen as detected object, the manner of progressive scanning on full screen causes delay of the detection of the contact point, which is also called first-point delay.

First-point delay is tolerable for common applications of capacitive screen. However, for the musical instrument playing, especially the musical instrument playing in the manner of clicking rather than sliding, the existence of the first-point delay causes the delay in the play, which affects the sense of music.

Therefore, there is a need of a control method for detecting the touch control operation, which is capable of responding to the touch control operation rapidly, thereby reducing the delay problem of the first-point detection.

The fourth embodiment of the present invention is made in consideration of the above problem. The fourth embodiment of the invention intends to provide a control method for detecting the detect touch control operation and an electronic apparatus, which reduces the data processing amount in the first-point detection by controlling part of a plurality of touch detecting units to be in working status to carry out the first-point detection within the detection range, so as to increase the processing speed of the first-point detection effectively and reduce the delay of the first-point detection.

According to one aspect of the fourth embodiment of the present invention, a control method is provided for detecting the touch control operation applied in an electronic apparatus, wherein the electronic apparatus at least includes a display screen, the electronic apparatus also includes a touch control unit supporting touch control function arranged in association with the display screen, the touch control unit includes a plurality of touch detecting units, and the control method comprises determining a detection range on the touch control unit and controlling part of the plurality of touch detecting units to be in working status within the detection range to detect the start position where the touch occurs.

Preferably, the control method further comprises controlling all of the plurality of the touch detecting units to be in working status after detecting the first-point.

Preferably, in the control method, when part of the plurality of the touch detecting units are in working status, a first plurality of touch detection points can be formed within the detection range, and when all of the plurality of the touch detecting units are in working status, a second plurality of touch detection points can be formed within the detection range.

Preferably, in the control method, the detection range is part of or entire range of the touch control unit, the detection range includes a first touch detection section and a second touch detection section, the first touch detection section is formed when part of the plurality of touch detecting units are in working status, the first touch detection section includes the first plurality of touch detection points, the second touch detection section includes a third plurality of touch detection points, the number of the third plurality of touch detection points is equal to the number of the second plurality of touch detection points subtracting the number of the first plurality of touch detection points, wherein the touch detection points in the first touch detection section and the touch detection points in the second touch detection section are arranged crossing with each other.

Preferably, the touch control unit is a projected capacitive touch control unit, the detection range includes the touch detecting units of R rows by S columns, each touch detecting unit forms a touch detection point, the first touch detection section includes the touch detection points of r rows by s columns in the touch detection points of R rows by S columns, the second touch detection section includes the remaining the touch detection points in the touch detection points of R rows by S columns, wherein the controlling part of the plurality of touch detecting units to be in working status comprises controlling the touch detecting units of r rows by s columns to be in working status to form the touch detection points of r rows by s columns.

Preferably, the touch control unit is a touch control unit of infrared ray type, the detection range comprises R touch detecting units corresponding to the R rows and S touch detecting units corresponding to the S columns, wherein, each touch detecting unit comprises an infrared transmitting unit and an infrared receiving unit, each crosspoint of the infrared ray transmitted between the infrared transmitting unit and infrared receiving unit corresponding to the row and the infrared ray transmitted between the infrared transmitting unit and infrared receiving unit corresponding to the column forms a touch detection point, wherein the controlling part of the plurality of touch detecting units to be in working status comprises: controlling the r touch detecting units in the R touch detecting units to be in working status, and controlling the s touch detecting units of the S touch detecting units to be in working status.

Preferably, the touch control unit is a touch control unit of surface acoustic wave type, the detection range comprises R touch detecting units corresponding to R rows and S touch detecting units corresponding to S columns, wherein each crosspoint of the ultrasonic wave transmitted by the touch detecting unit corresponding to the row and the ultrasonic wave transmitted by the touch detecting unit corresponding to the column forms a touch detection point, wherein, the controlling part of the plurality of touch detecting units to be in working status comprises controlling r touch detecting units in the R touch detecting units to be in working status, and controlling s touch detecting units in the S touch detecting units to be in working status.

According to another aspect of the fourth embodiment of the present invention, there provides an electronic apparatus including a display screen and a touch control unit supporting touch control function arranged in association with the display screen, the touch control unit includes a plurality of touch detecting unit and a touch detection control means, wherein, the touch control unit has a first touch detection mode and a second touch detection mode, and the touch detection control means determines the detection range of the touch control unit and controls the switching between the first touch detection mode and the second touch detection mode, wherein the touch detection control means controls part of the plurality of touch detecting units to be in working status in the first touch detection mode to detect the start position where the touch occurs.

Preferably, in the electronic apparatus, after detecting the first-point, the touch detection control means switches from the first touch detection mode to the second touch detection mode, and in the second touch detection mode, the touch detection control means controls all of the plurality of touch detecting units to be in working status.

Preferably, in the electronic apparatus, when part of the plurality of the touch detecting units are in working status, a first plurality of touch detection points can be formed within the detection range and when all of the plurality of the touch detecting unit are in working status, a second plurality of touch detection points can be formed within the detection range.

Preferably, in the electronic apparatus, the detection range is part of or entire range of the touch control unit, the detection range includes a first touch detection section and a second touch detection section, the first touch detection section is formed when part of the plurality of touch detecting units are in working status, and the first touch detection section includes a first plurality of the touch detection points, the second touch detection section includes a third plurality of touch detection points, the number of the third plurality of touch detection points is equal to the number of the second plurality of touch detection points subtracting the number of the first plurality of touch detection points, wherein the touch detection points in the first touch detection section and the touch detection points in the second touch detection section are arranged crossing with each other.

Preferably, in the electronic apparatus, the touch control unit is a touch control unit of projected capacitive type, the detection range includes the touch detecting units of R rows by S columns, each touch detecting unit forms a touch detection point, the first touch detection section includes the touch detection points of r rows by s columns in the touch detection points of R rows by S columns, the second touch detection section includes the remaining touch detection points in the touch detection points of R rows by S columns, wherein, R and S are natural numbers larger than 1, r is a natural number greater than or equal to 1 and less than or equal to R, s is a natural number greater than or equal to 1 and less than or equal to S, and r by s is less than R by S;

Wherein, in the first touch detection mode, the touch detection control means controls the touch detecting units of r rows by s columns to be in working status to form the touch detection points of r rows by s columns.

Preferably, in the electronic apparatus, the touch control unit is a touch control unit of infrared ray type, the detection range comprises R touch detecting units corresponding to the R rows and S touch detecting units corresponding to the S columns, wherein, each touch detecting unit includes an infrared transmitting unit and an infrared receiving unit, each crosspoint of the infrared ray transmitted between the infrared transmitting unit and infrared receiving unit corresponding to the row and the infrared ray transmitted between the infrared transmitting unit and infrared receiving unit corresponding to the column forms a touch detection point, wherein, in the first touch detection mode, the touch detection control means controls r touch detecting units in the R touch detecting units to be in working status, and controls s touch detecting units in the S touch detecting units to be in working status.

Preferably, in the electronic apparatus, the touch control unit is a touch control unit of surface acoustic wave type, the detection range includes R touch detecting units corresponding to R rows and S touch detecting units corresponding to S columns, wherein, each crosspoint of the ultrasonic wave transmitted by the touch detecting unit corresponding to the row and the ultrasonic wave transmitted by the touch detecting unit corresponding to the column forms a touch detection point, wherein in first touch detection mode, the touch detection control means controls r touch detecting units in the R touch detecting units to be in working status, and controls s touch detecting units in the S touch detecting units to be in working status.

Preferably, R and S are natural numbers larger than one, r is a natural number greater than or equal to one and less than or equal to R, s is a natural number greater than or equal to one and less than or equal to S, and r by s is less than R by S.

Preferably, the interval between the adjacent two rows in the r rows corresponding to the R touch detecting units is less than a first threshold, and the interval between the adjacent two columns in the s columns corresponding to the S touch detecting units is less than a second threshold.

With the control method for detecting the touch control operation and the electronic apparatus according to the fourth embodiment of the present invention, the data processing amount for the touch detection in the first-point detection is reduced, the processing speed of the first-point detection is increased, and thus the detection delay of the first-point touch is reduced.

The control method for detecting the touch control operation and the electronic apparatus according to the fourth embodiment of the present invention are described by referring to FIGS. 26 to 32 hereinafter.

For the above-described problem of first-point detection delay, the fourth embodiment of the invention provides a control method for detecting the touch control operation to carry out the first-point detection by controlling part of the plurality of touch detecting units to be in working status within the detection range, it reduces the delay of the first-point detection effectively by reducing the data processing amount in the first-point detection.

Figure 26:
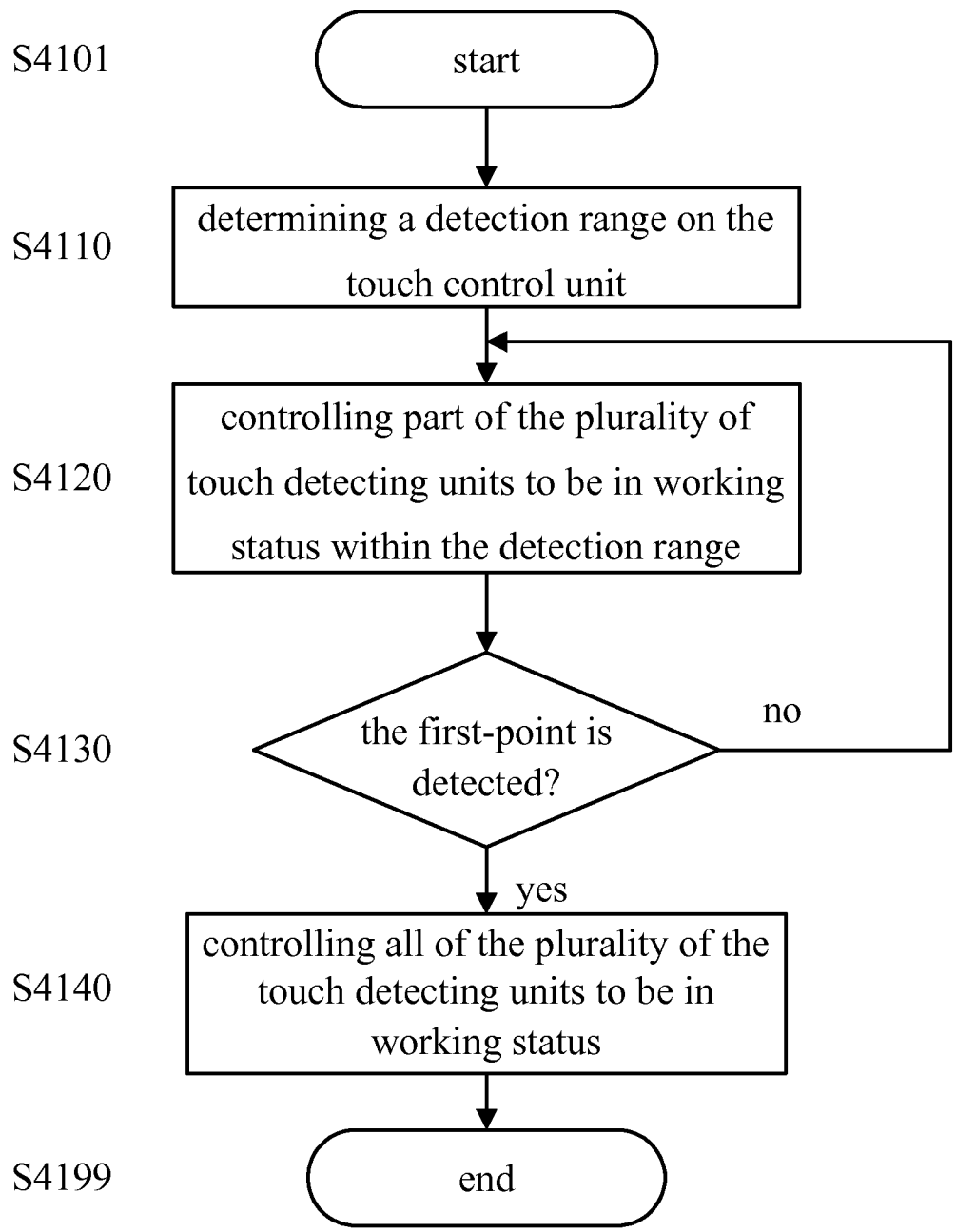
FIG. 26 is an exemplary flow chart of the control method for detecting the touch control operation according to the fourth embodiment of the present invention.

First, the control method for detecting the touch control operation 4100 according to the fourth embodiment of the present invention is described with reference to FIG. 26. The control method for detecting the touch control operation 4100 according to the embodiment of the present invention is applied in the electronic apparatus including a display screen and a touch control unit supporting the touch control function arranged in association with the display screen, and starts at step S4110. In the electronic apparatus, the touch control unit includes a plurality of touch detecting units.

In step S4110, a detection range on the touch control unit is determined. The detection range may be part of or entire range of the touch control unit.

Generally, the plurality of touch detecting units are provided on the touch control unit in various manners, when all of the plurality of touch detecting units are in working status, an array of the touch detection points is formed within the detection range, the touch to the touch detection point in the array of the touch detection point can be detected by the plurality of touch detecting units, in particular, the specific coordinates of the touch are recognizable.

For example, for the touch control unit of projected capacitive type, an array of touch sensors is provided on the touch control unit, each touch sensor can be a touch detecting unit, the touch is detected by detecting the capacitance of each touch sensor in the array of touch sensors.

For example, for the touch control unit of infrared ray type, a plurality of touch detecting units are provided on the touch control unit, each touch detecting unit includes an infrared transmitting unit and an infrared receiving unit, the plurality of touch detecting units include R touch detecting units corresponding to R rows and S touch detecting units corresponding to S columns. In particular, the infrared transmitting unit and the infrared receiving unit can be arranged on the opposite two sides (left side and right side, and upper side and lower side) of the touch control unit respectively, the position where the touch occurs is detected by detecting the infrared ray reception condition of the infrared receiving unit.

For example, for the touch control unit of surface acoustic wave type, an ultrasonic wave transmitting unit and an ultrasonic wave receiving unit are arranged around the touch control unit, the position where the touch occurs is detected by detecting the ultrasonic wave reception condition of the ultrasonic wave receiving unit. In such cases, the composition of the touch detecting unit may be different, the composition of the touch detecting unit under these different conditions are described in detail hereinafter.

In step S4120, part of the plurality of touch detecting units are controlled to be in working status within the detection range to detect the start position where the touch occurs, i.e., the first-point.

In other words, only part of the touch detection points within the detection range are carried out the touch detection to carry out the first-point detection of the touch within the detection range. More preferably, the part of the touch detection points spread over the detection range.

Preferably, the detection range is part of or entire scope of the touch control units, when part of the plurality of the touch detecting units are in working status, a first plurality of touch detection points is formed within the detection range; and when all of the plurality of the touch detecting units are in working status, a second plurality of touch detection points is formed within the detection range.

Preferably, the detection range includes a first touch detection section and a second touch detection section, when part of the plurality of touch detecting units forms the first touch detection section, the first touch detection section includes a first plurality of touch detection points, the second touch detection section includes a third plurality of touch detection points, the number of the third plurality of touch detection points is equal to the number of the second plurality of touch detection points subtracting the number of the first plurality of touch detection points.

Preferably, the touch detection point in the first touch detection section and the touch detection point in the second touch detection section are arranged crossing with each other. In one example, the touch detection points in the first touch detection section and the touch detection points in the second touch detection section are arranged in chessboard shape crossing with each other, and spread over the detection range.

In this case, for example, only the touch detection points in the first touch detection section within the detection range are carried out touch detection (i.e., the first plurality of touch detection points) to carry out the first-point detection of touch within the detection range.

In step S4130, whether the first-point is detected is decided. In case that the first-point isn't detected, the control method for detecting the touch control operation 4100 according to the embodiment of the present invention returns to step S4120, and continues to control part of the plurality of touch detecting units to be in working status within the detection range to detect the start position where touch occurs.

In case that the first-point is detected in step S4130, the control method for detecting the touch control operation 4100 according to the embodiment of the present invention proceeds to step S4140.

In step S4140, all of the plurality of touch detecting units is controlled to be in working status.

In other words, all of the touch detection points within the detection range are carried out the touch detection.

Finally, the control method for detecting the touch control operation 4100 according to the fourth embodiment of the present invention ends at step S4199.

Hereinafter, the operation of the control method for detecting the touch control operation 4100 according to the fourth embodiment of the present invention is described in detail with reference to FIGS. 27 to 31.

First Example: The Touch Control Unit of Projected Capacitive Type

In the electronic apparatus according to the first example of the fourth embodiment of the present invention, the touch control unit may be the touch control unit of projected capacitive type, the touch control unit of project capacitive type may comprise the touch detecting units of R rows by S columns (for example, a touch detection sensor) and the detection range thereof may be the entire touch control unit. In this case, the detection range includes the touch detecting units of R rows by S columns, each touch detecting unit forms one touch detection point, the first touch detection section includes the touch detection points of r rows by s columns in the touch detection points of R rows by S columns, the second touch detection section includes the remaining touch detection points in the touch detection points of R rows by S columns, wherein, R and S are natural numbers larger than 1, r is a natural number greater than or equal to 1 and less than or equal to R, s is a natural number greater than or equal to 1 and less than or equal to S, and r by s is less than R by S;

In this case, the controlling part of the plurality of touch detecting units to be in working status in step S4120 in the control method for detecting the touch control operation 4100 according to the fourth embodiment of the present invention comprises controlling the touch detecting units of r rows by s columns to be in working status to form the touch detection points of r rows by s columns. In other words, only the touch detection points of r rows by s columns are carried out scanning to read the detection result of the touch detection point of r rows by s columns in order.

Figure 27:
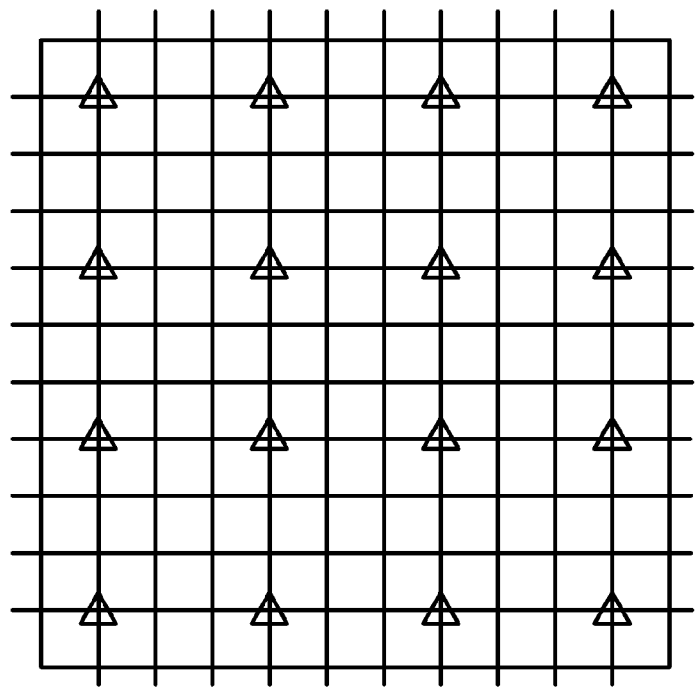
FIG. 27 illustrates a first example of the touch control unit of the electronic apparatus according to the fourth embodiment of the present invention.

FIG. 27 illustrates the schematic configuration of the touch control unit of the electronic apparatus according to the first example of the fourth embodiment of the present invention. For the convenience of the illustration, FIG. 27 only illustrates the touch detecting units of 10 by 10 (the touch detection points of 10 by 10, i.e., the second plurality of touch detection points) at the cross positions of 10 rows by 10 columns. The touch detection points in working status, specifically 16 touch detection points at the cross positions of the 1st, 4th, 7th, 10th rows and the 1st, 4th, 7th, 10th columns are indicated with symbol "Δ" in FIG. 27, as the first plurality of touch detection points in the first touch detection section, and the remaining touch detection points in FIG. 27 serve as the third plurality of touch detection points in the second touch detection section.

It be seen from FIG. 27 that, the first plurality of touch detection points in the first touch detection section (specifically 16 touch detection points) spread over the detection range.

In the example shown in FIG. 27, in the procedure of the first-point detection, the first-point detection is carried out by performing scanning to the touch detection points expressed by the symbol "Δ" (i.e., the touch detection points of 4 rows by 4 columns in all) and reading the detection result of the touch detection points of 4 rows by 4 columns in order. In this manner, the scanning of the original touch detection points of 10 rows by 10 columns is simplified to the scanning of the touch detection points of 4 rows by 4 columns, to increase the times of scanning to the detection range at unit time, and increase the speed of the detection to the first-point touch correspondingly.

Once the first-point touch is detected, part of the plurality of touch detecting units are no longer controlled in working status, and all of the plurality of touch detecting units are controlled to be in working status. In other words, once the first-point touch is detected, part of touch detection points in the touch detection point within the detection range are no longer carried out the touch detection, and all of the touch detection points within the detection range are carried out the touch detection to increase the detection accuracy of the touch detection.

Though the instance that the number of rows is equal to the number of columns of the touch control unit is illustrated in FIG. 27, the embodiments of the present invention are not limited thereto, those skilled in the art can set any proper number of rows and number of columns as necessary. Further, though the instance that two rows of the second touch detection section are included between the two adjacent rows in the first touch detection section and two columns of the second touch detection section are included between the two adjacent columns in the first touch detection section is illustrated in FIG. 27, the embodiments of the present invention are not limited thereto, those skilled in the art can set the crossing manner of the first touch detection section and the second touch detection section as necessary. For example, one row of the second touch detection section may be included between two adjacent rows of the first touch detection section, and three columns of the second touch detection section are included between two adjacent columns of the first touch detection section, and so on.

Alternatively, the touch detection point at the cross positions of the 2nd, 4th, 6th, 8th, 10th rows, and the 1st, 3rd, 5th, 7th, 9th columns in the touch control unit in FIG. 27 may serve as the first plurality of touch detection points in the first touch detection section, and the remaining the touch detection points serve as the third plurality of touch detection points in the second touch detection section. In this case, the first plurality of touch detection points in the first touch detection section may also spread over the detection range.

Alternatively, the touch detection point at the cross positions of the 1st, 3rd, 5th, 7th, 9th rows, and the 1st, 4th, 7th, 10th columns in the touch control unit in FIG. 27 may serve as the first plurality of touch detection points in the first touch detection section, and the remaining touch detection points serve as the third plurality of touch detection points in the second touch detection section. In this case, the first plurality of touch detection points in the first touch detection section may also spread over the detection range.

Though the case that the detection range is the entire touch control unit is illustrated above, the embodiments of the present invention are not limited thereto, those skilled in the art can set the detection range as part of the touch control units as necessary. For example, half of the touch control unit may serve as the detection range, and the above-described control method is applied to such case likewise.

In the touch control unit of the electronic apparatus according to the first example of the fourth embodiment of the present invention, the response speed of the first-point detection is increased and the delay time of the first-point detection is reduced correspondingly by reducing the number of the touch detection point scanned.

Second Example: The Touch Control Unit of Infrared Ray Type

In the electronic apparatus according to the second example of the fourth embodiment of the present invention, the touch control unit may be the touch control unit of infrared ray type, and the detection range may be the entire touch control unit. The touch control unit of infrared ray type may comprise R touch detecting units corresponding to R rows and S touch detecting units corresponding to S columns, wherein, each touch detecting unit includes an infrared transmitting unit and an infrared receiving unit. In other words, the touch control unit of infrared ray type may comprise R infrared transmitting units and R infrared receiving units corresponding to R rows as well as S infrared transmitting units and S infrared receiving units corresponding to S columns.

Each crosspoint of the infrared ray transmitted between the infrared transmitting unit and the infrared receiving unit corresponding to row with the infrared ray transmitted between the infrared transmitting unit and the infrared receiving unit corresponding to column forms a touch detection point.

In this case, it is equivalent to the touch detection points of R rows by S columns existing on the touch control unit of infrared ray type, that is, the touch detection points of R by S defined by the crosspoints of the infrared rays of R rows transmitted between the R infrared transmitting units and the R infrared receiving units with the infrared rays of S columns transmitted between the S infrared transmitting units and the S infrared receiving units.

The first touch detection section may comprise the touch detection points of r row by s column in the touch detection points of R rows by S columns, the second touch detection section includes the remaining touch detection points in the touch detection points of R rows by S columns, wherein, R and S are natural numbers larger than 1, r is a natural number greater than or equal to 1 and less than or equal to R, s is a natural number greater than or equal to 1 and less than or equal to S, and r by s is less than R by S.

The controlling part of the plurality of the touch detecting units to be in working status in step S4120 of the control method for detecting the touch control operation 4100 according to the fourth embodiment of the present invention comprises controlling the r touch detecting units in the R touch detecting units to be in working status, and controlling the s touch detecting units in the S touch detecting units to be in working status.

In particular, the r infrared transmitting units and the r infrared receiving units in the R infrared transmitting units and the R infrared receiving units are controlled to be in working status, the s infrared transmitting units and the s infrared receiving units in the S infrared transmitting units and the S infrared receiving units are controlled to be in working status, so that the first touch detection section is constituted by the touch detection points of r rows by s columns in the touch detection points of R rows by S columns.

In the electronic apparatus according to the second example of the fourth embodiment of the present invention, in case that a certain infrared receiving unit in working status does not receive the infrared ray, it indicates there is touch at the row or column where the infrared receiving unit is.

Figure 28:
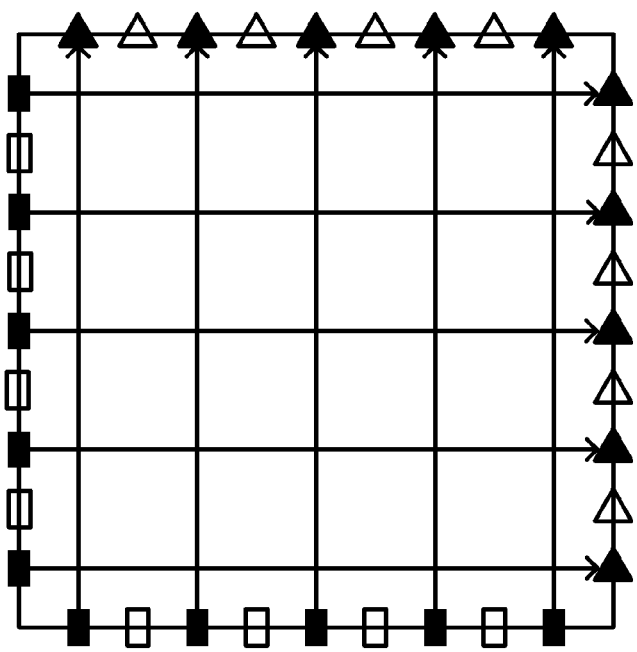
FIG. 28 illustrates a second example of the touch control unit of the electronic apparatus according to the fourth embodiment of the present invention.

FIG. 28 illustrates the schematic configuration of the touch control unit of the electronic apparatus according to the second embodiment of the present invention. For the convenience of illustration, FIG. 28 only illustrates 9 infrared transmitting units and 9 infrared receiving units corresponding to 9 rows as well as 9 infrared transmitting units and 9 infrared receiving units corresponding to 9 columns. The infrared transmitting unit is illustrated with symbol "□" and "■" and the infrared receiving unit is illustrated with symbol "Δ" and "▲" in FIG. 28, wherein, "■" represents the infrared transmitting unit in working status, and "▲" represents the infrared receiving unit in working status. The touch detection points in working status (i.e., active touch detection points or the first plurality of touch detection points) are formed at cross positions of the infrared ray transmitted between the infrared transmitting unit in working status and the infrared receiving unit the infrared transmitting unit corresponding to rows with the infrared ray transmitted between the infrared transmitting unit in working status and the infrared receiving unit the infrared transmitting unit corresponding to columns. In FIG. 28, the infrared transmitting units and the infrared receiving units in the 1st, 3rd, 5th, 7th, and 9th rows are in working status, and the infrared transmitting units and the infrared receiving units in the 1st, 3rd, 5th, 7th, and 9th columns are in working status. In this case, the touch detection points at the crossover positions of the 1st, 3rd, 5th, 7th, 9th rows, and the 1st, 3rd, 5th, 7th, 9th columns serve as the first plurality of touch detection points in the first touch detection section, and the remaining touch detection points not shown in FIG. 28 serve as the third plurality of touch detection points in the second touch detection section.

It can be seen from FIG. 28 that, the first plurality of touch detection points in the first touch detection section (specifically 25 touch detection points) spread over the detection range.

In the example shown in FIG. 28, the first-point detection is carried out according to the infrared ray reception condition of the infrared receiving unit represented by symbol "▲" in the procedure of the first-point detection. In particular, in case that the infrared receiving unit represented by the symbol "▲" does not receive the infrared ray, it indicates there is touch at the row or column where the infrared ray receiving unit is. For example, if the infrared receiving unit at the 3rd row and the 5th column represented by symbol "▲" does not receive the infrared ray, it indicates there is touch, i.e., first-point touch at the crossover position of the 3rd row and the 5th column.

In this manner, the original first detection mode is simplified as the first-point detection mode, wherein the original first detection mode is: the infrared transmitting units and the infrared receiving units of R rows (for example, 9 rows in FIG. 28) as well as the infrared transmitting units and the infrared receiving units of S columns (for example, 9 columns in FIG. 28) are in working status, and the first-point detection is carried out according to the detection result thereof; the first-point detection mode is: the infrared transmitting units and the infrared receiving units of r rows (for example, 5 rows in FIG. 28) in the infrared transmitting units and the infrared receiving units of R rows (for example, 9 rows in FIG. 28) as well as the infrared transmitting units and the infrared receiving units of s columns (for example, 5 columns in FIG. 28) in the infrared transmitting units and the infrared receiving units of S columns (for example, 9 columns in FIG. 28) are in working status, and the first-point detection is carried out according to the detection result thereof. In the first-point detection, the signal processing amount is reduced, and the speed of the detection to the first-point touch is increased correspondingly.

Once the first-point touch is detected, the touch detection are no longer carried out to part of the touch detection points in the touch detection point within the detection range, in particular, the r (for example, 5 in FIG. 28) infrared transmitting units and the r infrared receiving units in the R (for example, 9 in FIG. 28) and the R infrared receiving units are no longer made to be in working status, as well as the s (for example, 5 in FIG. 28) infrared transmitting units and the s infrared receiving units in the S (for example, 9 in FIG. 28) infrared transmitting units and the S infrared receiving units are no longer made to be in working status, but the R (for example, 9 in FIG. 28) and the R infrared receiving units as well as the S (for example, 9 in FIG. 28) infrared transmitting units and the S infrared receiving units are made to be in working status to increase the detection accuracy of the touch detection.

Though FIG. 28 illustrates the case that the number of rows of the touch control unit is equal to the number of columns, the embodiments of the present invention are not limited thereto, and those skilled in the art can set any proper number of rows and number of columns as required. Further, though FIG. 28 illustrates the infrared transmitting units and the infrared receiving units of the 1st, 3rd, 5th, 7th and 9th rows are in working status and the infrared transmitting units and the infrared receiving units of the 1st, 3rd, 5th, 7th and 9th columns are in working status, the embodiments of the present invention are not limited thereto, those skilled in the art can set the infrared transmitting units and the infrared receiving units in working status as required. For example, the infrared transmitting units and the infrared receiving units of the 1st, 3rd, 5th, 7th, and 9th rows are in working status, and the infrared transmitting units and the infrared receiving units of the 2nd, 4th, 6th, and 8th columns are in working status, and so on. Alternatively, the infrared transmitting units and the infrared receiving units of the 1st, 4th, 7th, and 9th rows are made to be in working status, and the infrared transmitting units and the infrared receiving units of the 2nd, 4th, 6th, and 8th columns are made to be in working status. In this case, the first plurality of touch detection points in the first touch detection section also spread over the detection range.

Though the case that the detection range is the entire touch control unit is illustrated above, the embodiments of the present invention are not limited thereto, those skilled in the art can set the detection range as part of the touch control unit as required. For example, half of the touch control unit may serve as the detection range, and the above-described control method is applied to such case likewise.

Third Example: The Touch Control Unit of Surface Acoustic Wave Type

In the electronic apparatus according to the third example of the fourth embodiment of the present invention, the touch control unit may be the touch control unit of surface acoustic wave type, and the detection range may be the entire touch control unit.

The touch control unit of surface acoustic wave type includes R touch detecting units corresponding to R rows and S touch detecting units corresponding to S columns, wherein, each crosspoint of the ultrasonic wave transmitted by the touch detecting units corresponding to row with the ultrasonic wave transmitted by the touch detecting units corresponding to column forms a touch detection point (touch detection points of R rows by S columns). In particular, the touch control unit of surface acoustic wave type is provided with the touch detection points of R rows by S columns by transmitting and receiving the ultrasonic wave in row direction and column direction.

The controlling part of the plurality of the touch detecting units to be in working status in step S4120 of the control method for detecting the touch control operation 4100 according to the fourth embodiment of the present invention comprises controlling the r touch detecting units in the R touch detecting units to be in working status, and controlling the s touch detecting units in the S touch detecting units to be in working status.

In particular, in the first-point detection, the ultrasonic wave signal may be received only in r rows and the ultrasonic wave signal may be received only in s columns, or only the ultrasonic wave signals corresponding to the r rows are processed or only the ultrasonic wave signals corresponding to the s columns are processed. The first touch detection section may comprise the touch detection points of r rows by s columns in the touch detection points of R rows by S columns, the second touch detection section includes the remaining touch detection points in the touch detection points of R rows by S columns, wherein, R and S are natural numbers larger than 1, r is a natural number greater than or equal to 1 and less than or equal to R, is a natural number greater than or equal to 1 and less than or equal to S, and r by s is less than R by S, so that the touch detection is carried out to only the touch detection points of r by s spread over the detection range in the touch control unit.

Hereinafter, the exemplary application of the touch control unit of surface acoustic wave is described by being classified into three specific instances.

First Specific Instance

Figure 29:
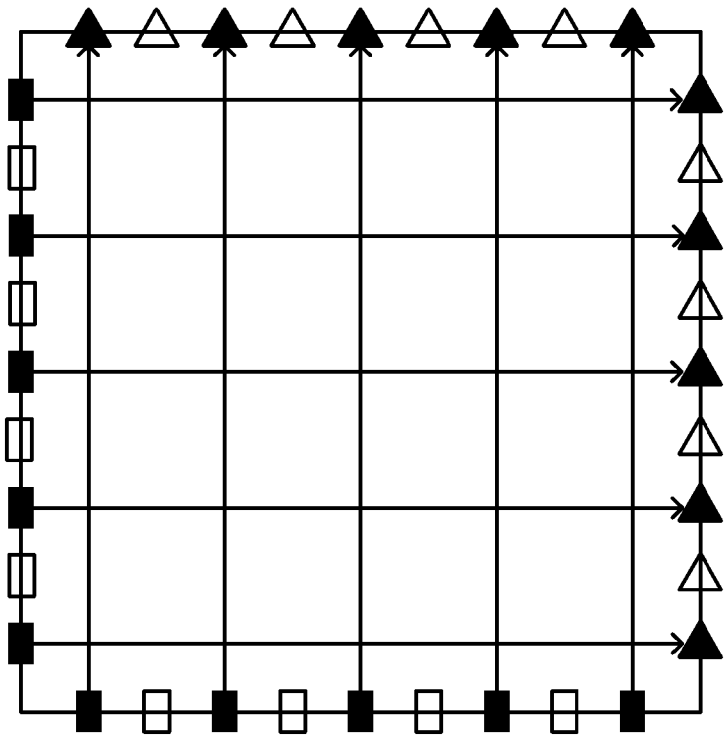
FIG. 29 illustrates a first specific instance of the third example of the touch control unit of the electronic apparatus according to the fourth embodiment of the present invention.

In the first specific instance of the touch control unit of the electronic apparatus according to the third example of the fourth embodiment of the present invention, as shown in FIG. 29, the touch control unit of surface acoustic wave may include R touch detecting units corresponding to R rows and S touch detecting units corresponding to S columns, each touch detecting unit includes an ultrasonic wave transmitting unit and an ultrasonic wave receiving unit. In particular, the touch control unit of surface acoustic wave type may include R ultrasonic wave transmitting units and R ultrasonic wave receiving units corresponding to R rows as well as S ultrasonic wave transmitting units and S ultrasonic wave receiving units corresponding to S columns. In this case, it is equivalent to the touch detection points of R rows by S columns existing on the touch control unit of surface acoustic wave type, that is, the touch detection points of R by S defined by the crosspoint of the ultrasonic wave of R rows transmitted between the R ultrasonic wave transmitting units and the R ultrasonic wave receiving units with the ultrasonic wave of S columns transmitted between the S ultrasonic wave transmitting units and the S ultrasonic wave receiving unit. The first touch detection section may include the touch detection points of r rows by s columns in the touch detection points of R rows by S columns, the second touch detection section includes the remaining touch detection points in the touch detection point of R rows by S columns.

In particular, the r ultrasonic wave transmitting units and r ultrasonic wave receiving units in the R ultrasonic wave transmitting units and R ultrasonic wave receiving units are controlled to be in working status, the s ultrasonic wave transmitting units and s ultrasonic wave receiving units in the S ultrasonic wave transmitting units and S ultrasonic wave receiving units are controlled to be in working status, so that the first touch detection section is constituted by the touch detection points of r rows by s columns in the touch detection points of R rows by S columns.

In the first specific instance of the touch control unit of the electronic apparatus according to the third example of the fourth embodiment of the present invention, in case that a certain ultrasonic wave receiving unit in working status does not receive the ultrasonic wave, it indicates there is touch at the row or column where the ultrasonic wave receiving unit is.

Similar to FIG. 28, for the convenience of illustration, FIG. 29 only illustrates 9 ultrasonic wave transmitting units and 9 ultrasonic wave receiving unit corresponding to 9 rows as well as 9 ultrasonic wave transmitting units and 9 ultrasonic wave receiving unit corresponding to 9 columns. In FIG. 29, the ultrasonic wave transmitting unit is illustrated with symbol "□" and "■" and the ultrasonic wave receiving unit is illustrated with symbol "Δ" and "▲", wherein, "■" represents the ultrasonic wave transmitting unit in working status, and "▲" represents the ultrasonic wave receiving unit in working status. In FIG. 29, the ultrasonic wave transmitting units and the ultrasonic wave receiving units in the 1st, 3rd, 5th, 7th and 9th rows are in working status, and the ultrasonic wave transmitting units and the ultrasonic wave receiving units in the 1st, 3rd, 5th, 7th and 9th columns are in working status. In this case, the touch detection points at the crossover positions of the 1st, 3rd, 5th, 7th, 9th rows and the 1st, 3rd, 5th, 7th, 9th columns serve as the first plurality of touch detection points in the first touch detection section, and the remaining touch detection points in FIG. 29 serve as the third plurality of touch detection points in the second touch detection section.

It can be seen from FIG. 29 that, the first plurality of touch detection points in the first touch detection section (specifically 25 touch detection points) spread over the detection range.

In the example shown in FIG. 29, the first-point detection is carried out according to the ultrasonic wave reception condition of the ultrasonic wave receiving unit represented by symbol "▲" in the procedure of the first-point detection. In particular, in case that the ultrasonic wave receiving unit represented by the symbol "▲" does not receive the ultrasonic wave, it indicates there is touch at the row or column where the ultrasonic wave receiving unit is. For example, if the ultrasonic wave receiving unit at the 3rd row and the 5th column represented by symbol "▲" does not receive the ultrasonic wave, it indicates there is touch, i.e., the first-point touch at the crossover position of the 3rd row and the 5th column.

In this manner, the original first detection mode is simplified as the first-point detection mode, wherein the original first detection mode is the ultrasonic wave transmitting units and the ultrasonic wave receiving units of R rows (for example, 9 rows in FIG. 29) as well as the ultrasonic wave transmitting units and the ultrasonic wave receiving units of S columns (for example, 9 columns in FIG. 29) are all in working status, and the first-point detection is carried out according to the detection result thereof the first-point detection mode is the ultrasonic wave transmitting units and the ultrasonic wave receiving units of r rows (for example, 5 rows in FIG. 29) in the ultrasonic wave transmitting units and the ultrasonic wave receiving units of R rows (for example, 9 rows in FIG. 29), as well as the ultrasonic wave transmitting units and the ultrasonic wave receiving units of s columns (for example, 5 columns in FIG. 29) in the ultrasonic wave transmitting units and the ultrasonic wave receiving units of S columns (for example, 9 columns in FIG. 29) are in working status, and the first-point detection is carried out according to the detection result thereof. In the first-point detection, the signal processing amount is reduced, and the speed of the detection to the first-point touch is increased correspondingly.

Once the first-point touch is detected, not only part of the plurality of the touch detecting units are controlled to be in working status, but all of the touch detecting units are controlled to be in working status. In other words, once the first-point touch is detected, the touch detection is not carried out to only part of touch detection points in the touch detection points within the detection range any longer.

In particular, once the first-point touch is detected, not only the r (for example, 5 in FIG. 29) ultrasonic wave transmitting units and the r ultrasonic wave receiving units in the R (for example, 9 in FIG. 29) ultrasonic wave transmitting units and the R ultrasonic wave receiving units are made to be in working status any longer, and not only the s (for example, 5 in FIG. 29) ultrasonic wave transmitting units and the s ultrasonic wave receiving units in the S (for example, 9 in FIG. 29) ultrasonic wave transmitting units and the S ultrasonic wave receiving units are made to be in working status any longer, but the R (for example, 9 in FIG. 29) ultrasonic wave transmitting units and the R ultrasonic wave receiving units as well as the S (for example, 9 in FIG. 29) ultrasonic wave transmitting units and the S ultrasonic wave receiving units are all made to be in working status, so as to increase the detection accuracy of the touch detection.

Though FIG. 29 illustrates the case that the number of rows of the touch control units is equal to the number of columns, the embodiments of the present invention are not limited thereto, and those skilled in the art can set any proper number of rows and number of columns as required. Further, though FIG. 29 illustrates the case that the ultrasonic wave transmitting units and the ultrasonic wave receiving units of the 1st, 3rd, 5th, 7th and 9th rows are in working status and the ultrasonic wave transmitting units and the ultrasonic wave receiving units of the 1st, 3rd, 5th, 7th and 9th columns are in working status, the embodiments of the present invention are not limited thereto, those skilled in the art can set the ultrasonic wave transmitting units and the ultrasonic wave receiving units in working status as required. For example, the ultrasonic wave transmitting units and the ultrasonic wave receiving units of the 1st, 3rd, 5th, 7th, and 9th rows are in working status, and the ultrasonic wave transmitting units and the ultrasonic wave receiving units of the 2nd, 4th, 6th, and 8th columns are in working status, and so on. Alternatively, the ultrasonic wave transmitting units and the ultrasonic wave receiving units of the 1st, 4th, 7th, and 9th rows are made to be in working status, and the ultrasonic wave transmitting units and the ultrasonic wave receiving units of the 2nd, 4th, 6th, and 8th columns are made to be in working status. In this case, the first plurality of touch detection points in the first touch detection section also spread over the detection range.

Though the case that the detection range is the entire touch control unit is illustrated above, the embodiments of the present invention are not limited thereto, those skilled in the art can set the detection range as part of the touch control unit as required. For example, half of the touch control unit may serve as the detection range, and the above-described control method is applied to such case likewise.

Second Specific Instance

Figure 30:
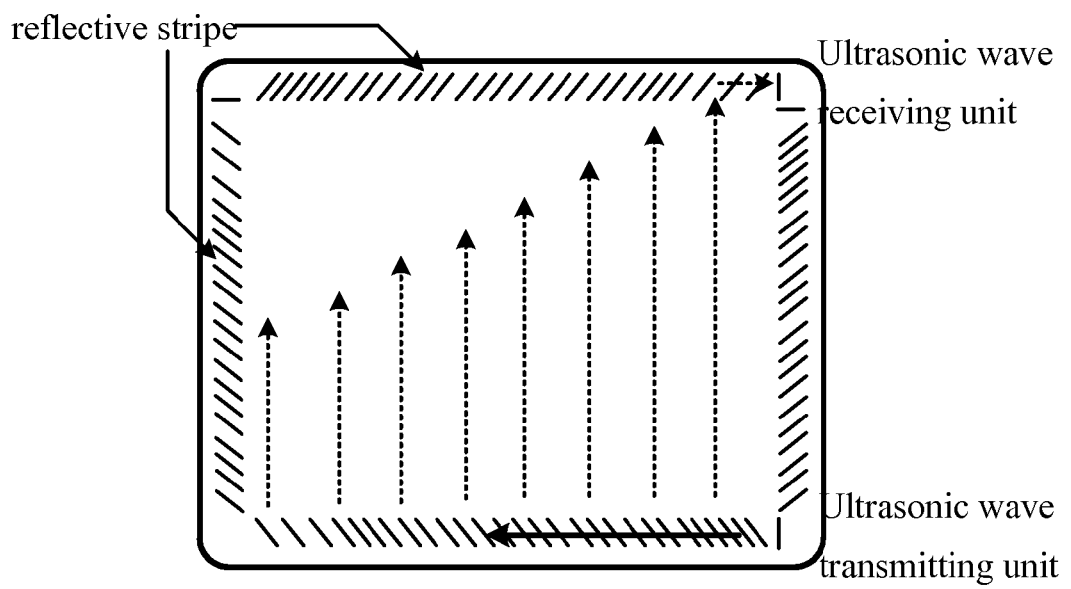
FIG. 30 illustrates a second specific instance of the third example of the touch control unit of the electronic apparatus according to the fourth embodiment of the present invention.

FIG. 30 illustrates the second specific instance of the touch control unit of the electronic apparatus according to the third example of the fourth embodiment of the present invention, wherein the touch control unit of surface acoustic wave type may include R touch detecting units corresponding to R rows and S touch detecting units corresponding to S columns. Further, the touch control unit of surface acoustic wave type also includes a first ultrasonic wave transmitting unit and a first ultrasonic wave receiving unit corresponding to R rows as well as a second ultrasonic wave transmitting unit and a second ultrasonic wave receiving unit corresponding to S columns.

The R touch detecting units corresponding to R rows may be R reflective stripes of 45° angle provided on the left and right sides of the touch control unit of surface acoustic wave type, and the S touch detecting units corresponding to S columns may include S reflective stripes of 45° angle on the upper and lower sides of the touch control unit of surface acoustic wave type.

The first ultrasonic wave transmitting unit is on the lower right corner of the touch control unit, the first ultrasonic wave receiving unit is on the upper right corner of the touch control unit, the second ultrasonic wave transmitting unit (not shown in FIG. 30) is on the upper left corner of the touch control unit, and the second ultrasonic wave receiving unit (not shown in FIG. 30) is on the upper right corner of the touch control unit.

In this case, it is equivalent to the touch detection points of R rows by S columns existing on the touch control unit of surface acoustic wave type, i.e., the touch detection points of R by S defined by the crosspoint of the ultrasonic waves of R rows transmitted between the R reflective stripes of 45° angle on the left and right sides of the touch control unit of surface acoustic wave type with the ultrasonic waves of S columns transmitted between the S reflective stripes of 45° angle on the upper and lower sides of the touch control unit of surface acoustic wave type. The first touch detection section may include the touch detection points of r rows by s columns in the touch detection points of R rows by S columns, and the second touch detection section includes the remaining touch detection points in the touch detection point of R rows by S columns.

The controlling part of the plurality of the touch detecting units to be in working status in step S4120 of the control method for detecting the touch control operation 4100 according to the fourth embodiment of the present invention may include any one of the following two kinds of instances:

1) Only the ultrasonic wave signals at r timings (for example, r timings corresponding to the 1st, 3rd, 5th, and 7th rows or the like) in the plurality of ultrasonic wave signals received by the first ultrasonic wave receiving unit are detected and the other ultrasonic wave signals received by the first ultrasonic wave receiving unit are neglected, and only the ultrasonic wave signals at s timings (for example, s timings corresponding to the 1st, 3rd, 5th, and 7th rows or the like) in the plurality of ultrasonic wave signals received by the second ultrasonic wave receiving unit are detected and the other ultrasonic wave signal received by the second ultrasonic wave receiving unit are neglected.

2) Only r reflective stripes in the R reflective stripes of 45° angle are brought into usage, and only s reflective stripes in the S reflective stripes of 45° angle are brought into usage, that is, brought to transmit the ultrasonic wave. For example, in the first-point detection, mechanical switch can be provided to set the r reflective stripes of the R reflective stripes of 45°angle into the propagation path of the ultrasonic wave and set the s reflective stripes of the S reflective stripes of 45° angle into the propagation path of the ultrasonic wave; and in the normal touch detection, all of the R reflective stripes of 45° angle and S reflective stripes of 45° angle are set into the propagation path of the ultrasonic wave. Alternatively, for example, in the first-point detection, a mechanical switch can be provided to set R-r reflective stripes of the R reflective stripes of 45° angle to be removed from the propagation path of the ultrasonic wave and set S-s reflective stripes of the S reflective stripes of 45° angle to be removed from the propagation path of the ultrasonic wave; and in the normal touch detection, all of the R reflective stripes of 45° angle and S reflective stripes of 45° angle are set into the propagation path of the ultrasonic wave.

In this case, if for example the ith timing in the r timings is not detected, it indicates that there is touch on the row or column corresponding to the ith timing.

For example, the touch detection points at the crossover positions of the 1st, 3rd, 5th, 7th, and 9th rows and the 1st, 3rd, 5th, 7th, and 9th columns serve as the first plurality of touch detection points in the first touch detection section. The first plurality of touch detection points in the first touch detection section (specifically 25 touch detection points) spread over the detection range. If the first ultrasonic wave receiving unit does not receive the ultrasonic wave of the timing corresponding to the 7th row, and the second ultrasonic wave receiving unit does not receive the ultrasonic wave of the timing corresponding to the 3rd column, it indicates that there is touch, i.e., the first-point touch on the crossover position of the 7th row and the 3rd column.

In this manner, the original first detection mode is simplified to the first-point detection mode, wherein, the original first detection mode is detecting whether the first ultrasonic wave receiving unit receives the ultrasonic wave corresponding to R rows and detecting whether the second ultrasonic wave receiving unit receives the ultrasonic wave corresponding to S columns, and detecting the touch according to the detection result; the first-point detection mode is detecting only whether the first ultrasonic wave receiving unit receives the ultrasonic wave corresponding to r rows in the R rows, and detecting only whether the second ultrasonic wave receiving unit receives the ultrasonic wave corresponding to s columns in the S columns, and detecting the first-point detection according to the detection result. In the first-point detection, the signal processing amount is reduced, and the speed of the detection to the first-point touch is increased correspondingly.

Once the first-point touch is detected, it switches to the first detection mode to increase the detection accuracy of the touch detection.

Though FIG. 30 illustrates the case that the number of rows of the touch control units is equal to the number of columns, the embodiments of the present invention are not limited thereto, and those skilled in the art can set any proper number of rows and number of columns as required. Further, those skilled in the art can set the number of r, s, R and S as required, as long as ensuring the first plurality of touch detection points in first touch detection section also spread over the detection range.

Though the case that the detection range is the entire touch control unit is illustrated above, the embodiments of the present invention are not limited thereto, those skilled in the art can set the detection range as part of the touch control unit as required. For example, half of the touch control unit may serve as the detection range, and the above-described control method is applied to such case likewise.

Third Specific Instance

Figure 31:
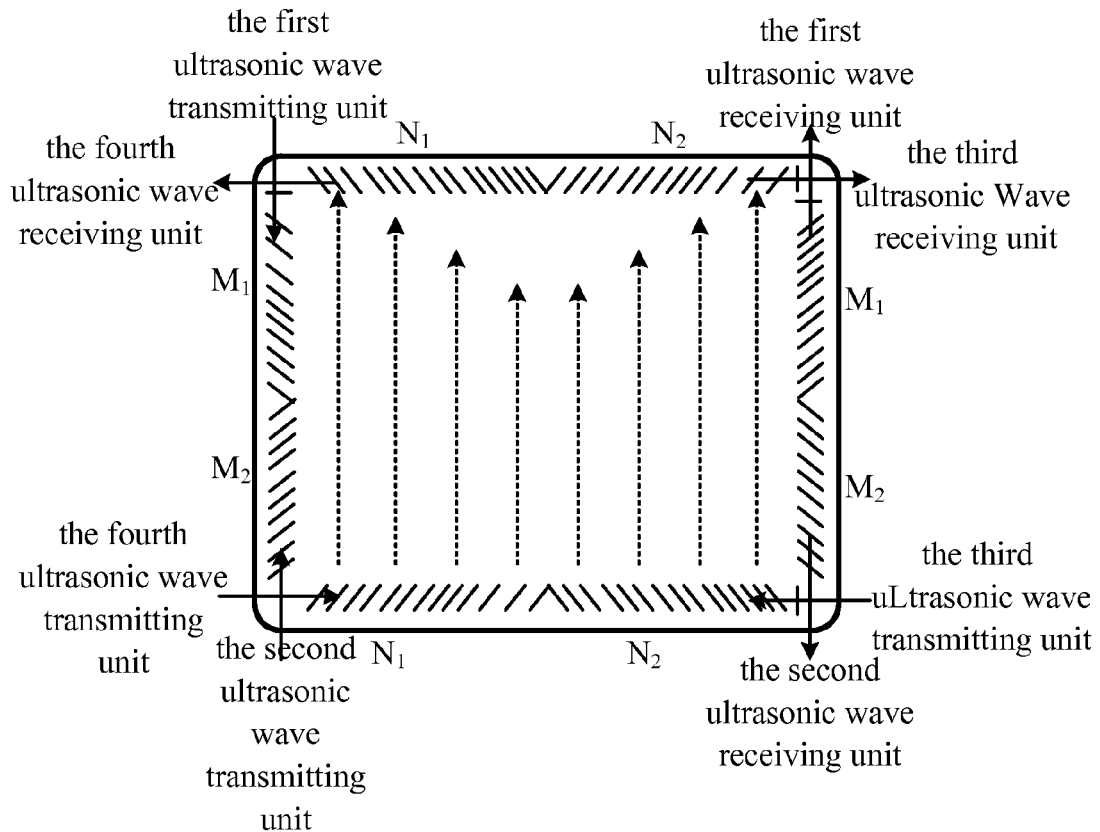
FIG. 31 illustrates a third specific instance of the third example of the touch control unit of the electronic apparatus according to the fourth embodiment of the present invention.

In the third specific instance of the touch control unit of the electronic apparatus according to the third example of the fourth embodiment of the present invention, those skilled in the art can set R1 reflective stripes of 45° angle and R2 reflective stripes of 45° angle in inverse direction on the left and right sides of the touch control unit respectively, and set S1 reflective stripes of 45° angle and S2 reflective stripes of 45° angle in inverse direction on the upper and lower sides of the touch control unit respectively as required, as shown in FIG. 31.

In this case, a first ultrasonic wave transmitting unit (for transmitting the ultrasonic wave to the reflective stripe at the upper part of left side) is provided on the upper left corner of the touch control unit, a first ultrasonic wave receiving unit (for receiving the ultrasonic wave reflected from the reflective stripe at the upper part of the right side) is provided on the upper right corner of the touch control unit, a second ultrasonic wave transmitting unit (for transmitting the ultrasonic wave to the reflective stripe at the lower part of left side) is provided on the lower left corner of the touch control unit, a second ultrasonic wave receiving unit (for receiving the ultrasonic wave reflected from the reflective stripe at the lower part of the right side) is provided on the lower right corner of the touch control unit, a third ultrasonic wave transmitting unit (for transmitting the ultrasonic wave to the reflective stripe at the right part of lower side) is provided on the lower right corner of the touch control unit, a third ultrasonic wave receiving unit (for receiving the ultrasonic wave reflected from the reflective stripe at the right part of the upper side) is provided on the upper right corner of the touch control unit, a fourth ultrasonic wave transmitting unit (for transmitting the ultrasonic wave to the reflective stripe at the left part of lower side) is provided on the lower left corner of the touch control unit, a fourth ultrasonic wave receiving unit (for receiving the ultrasonic wave reflected from the reflective stripe at the left part of the upper side) is provided on the upper left corner of the touch control unit.

In this case, in the first-point detection, only the ultrasonic wave signals at r1 timings in the plurality of ultrasonic wave signals received by the first ultrasonic wave receiving unit is detected, only the ultrasonic wave signals at r2 timings in the plurality of ultrasonic wave signals received by the second ultrasonic wave receiving unit is detected, only the ultrasonic wave signals at s1 timings in the plurality of ultrasonic wave signals received by the third ultrasonic wave receiving unit is detected, and only the ultrasonic wave signals at s2 timings in the plurality of ultrasonic wave signals received by the fourth ultrasonic wave receiving unit is detected. Alternatively, only the r1 reflective stripes in the R reflective stripes and the r2 reflective stripes in the R reflective stripe are brought into usage, and only the s1 reflective stripes in the S reflective stripes and the s2 reflective stripes in the S reflective stripe are brought into usage. Wherein, R and S are natural numbers larger than 1, r1 and r2 are natural numbers greater than or equal to 1 and r that is the sum of r1 and r2 is less than or equal to R, s1 and s2 are natural numbers greater than or equal to 1 and s that is the sum of s1 and s2 is less than or equal to S, and (r1+r2) by (s1+s2) is less than R by S, so that the touch detection is carried out to only the touch detection points of (r1+r2) by (s1+s2) spread over the detection range in the touch control unit.

In the touch control unit of the electronic apparatus according to the first example to the third example of the fourth embodiment of the present invention, the interval between the two adjacent rows in r rows is less than a first threshold, and the interval between the two adjacent columns in s columns is less than a second threshold. The first threshold and the second threshold can be set according to predetermined rule, for example, the first threshold and the second threshold are set according to the length and width of the general contact region where the touch control unit is touched by the finger of the user, according to the length and width of the touching object, and so on.

Figure 32:
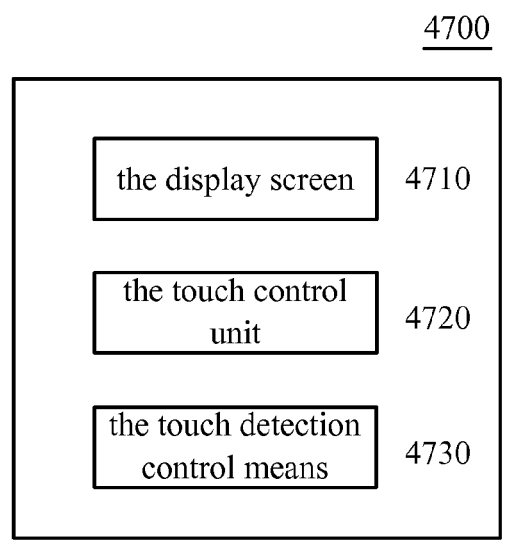
FIG. 32 illustrates an exemplary block diagram of the electronic apparatus according to the fourth embodiment of the present invention.

FIG. 32 illustrates the schematic block diagram of the electronic apparatus 700 according to the fourth embodiment of the present invention.

The electronic apparatus 700 includes a display screen 710, a touch control unit 720 supporting the touch control function arranged in association with the display screen, and a touch detection control means 730.

The touch control unit 720 includes a plurality of touch detecting units, and has a first touch detection mode and a second touch detection mode, and the touch detection control means 730 determines the detection range of the touch control unit 720 and controls the switching of the first touch detection mode and the second touch detection mode.

In the first touch detection mode, the touch detection control means controls part of the plurality of touch detecting units to be in working status to detect the start position where touch occurs.

After detecting the first-point, the touch detection control means switches from the first touch detection mode to the second touch detection mode, and in the second touch detection mode, the touch detection control means controls all of the plurality of touch detecting units to be in working status.

Wherein, all of the touch detection points within the detection range are used in the touch detection. In the first touch detection mode, only part of touch detection points of the touch detection points within the detection range are used in the touch detection, the part of touch detection points spread over the detection range.

The detection range can be part of or entire range of the touch control unit. When part of the plurality of touch detecting units are in working status, a first plurality of touch detection points can be formed within the detection range; and when all of the plurality of touch detecting units are in working status, a second plurality of touch detection points can be formed within the detection range.

The detection range includes a first touch detection section and a second touch detection section, the first touch detection section includes the first plurality of touch detection points, the second touch detection section includes a third plurality of touch detection points, wherein, the number of the third plurality of touch detection points is equal to the number of the second plurality of touch detection points subtracting the number of the first plurality of touch detection points, wherein, the touch detection points in the first touch detection section and the touch detection points in the second touch detection section are arranged crossing with each other.

The touch control unit 720 can be the touch control unit described previously with reference to the FIGS. 28 to 31.

In the control method for detecting the touch control operation and the electronic apparatus according to the fourth embodiment of the present invention, the number of the touch detection points used in the touch detection in the first-point detection is reduced, the processing speed of the first-point detection is increased, and thus the detection delay of the first-point touch is reduced.

Here, those skilled in the art can understand that, the control method and electronic apparatus according to the first embodiment of the present invention, the control method and electronic apparatus according to the third embodiment of the present invention as well as the control method and electronic apparatus according to the fourth embodiment of the present invention can be used in combination with each other or used individually. For example, in case that the control method and electronic apparatus according to the first embodiment of the present invention is used in combination with the control method and electronic apparatus according to the third embodiment of the present invention, the touch control unit of the electronic apparatus can be divided into a plurality of touch regions and further divided into a plurality of touch control layers. Also, for example, each of the plurality of touch regions in the control method and electronic apparatus according to the first embodiment of the present invention as well as the plurality of touch control layers in the control method and electronic apparatus according to the third embodiment of the present invention can correspond to one or more touch detecting units in the control method and electronic apparatus according to the fourth embodiment of the present invention to activate the corresponding touch detecting unit when one of the plurality of touch regions or one of the plurality of touch control layers is selectively activated.

Of course, those skilled in the art can understand that, the control method and electronic apparatus according to the first embodiment of the present invention, the control method and electronic apparatus according to the third embodiment of the present invention as well as the control method and electronic apparatus according to the fourth embodiment of the present invention can be combined in other manners, the embodiments of the present invention does not intend to make any limitation thereto.

It is obvious that those skilled in the art can make various kinds of modification and variation to the present invention without departing from the spirit and scope of the present invention. Thus, if these modifications and variations of the present invention falls within the scope of the claims of the present invention and the equivalent technology, the present invention intents to comprise these modifications and variations.

What is claimed is:

1. A control method of an electronic apparatus, the electronic apparatus having a touch control unit, on which at least one operating icon being fixedly located, comprising:
   determining a first touch region corresponding to the at least one operating icon, being fixedly located, the first touch region having an area less than an area of the touch control unit;
   determining a second touch region on the touch control unit according to the first touch region, the second touch region having a region other than the first touch region on the touch control unit;
   generating a control instruction for making touch function of the second touch region to be in a disable status; and
   executing the control instruction to make the touch function of the second touch region to be in the disable status,
   wherein, the electronic apparatus at least has a display screen, the touch control unit is arranged in association with the display screen and supports the touch control function, and the touch control unit has a plurality of touch detecting units,
   the method further comprising:
   determining a detection range on the touch control unit in advance;
   controlling a part of the plurality of touch detecting units to be in working status within the detection range to detect a start position of first-point touch where touch occurs; and
   once the first-point touch is detected, controlling the remaining touch detecting units of the plurality of touch detecting units to change from the disable status to the working status, so that all of the plurality of touch detecting units to be in working status.

2. The method of claim 1, wherein the determining the first touch region step corresponding to the at least one operating icon comprises:
   determining a first coordinate information in the touch control unit corresponding to each operating icon in the at least one operating icon, wherein, the first coordinate information includes a first start coordinate information and a first end coordinate information; and
   determining the first touch region corresponding to the at least one operating icon according to the first coordinate information.

3. The method of claim 2, wherein the determining the first touch region corresponding to the at least one operating icon according to the first coordinate information comprises:
   arranging the at least one operating icon based on a preset rule of the system of the electronic apparatus according to the first coordinate information, to obtain the second coordinate information corresponding to the first touch region, wherein, the second coordinate information includes a second start coordinate information and a second end coordinate information;
   determining the first touch region corresponding to the at least one operating icon of the second coordinate information.

4. The method of claim 1, wherein the touch control unit at least includes a first touch control layer and a second touch control layer, wherein, a first power consumption corresponding to the first touch control layer is less than a second power consumption of the second touch control layer, the method further comprising:
  detecting whether a first distance between the touch control unit and a first object is larger than a first preset threshold to obtain a detection result;
  controlling the first touch control layer to be in working status and the second touch control layer to be in non-working status if the detection result indicates the first distance is larger than the first preset threshold; and
  controlling only the second touch control layer to be in working status if the detection result indicates the first distance is less than the preset threshold.

5. The method of claim 4, wherein the detecting whether the first distance between the touch control unit and the first object is larger than the first preset threshold specifically comprises:
  detecting to obtain the first distance between the touch control unit and the first object by the first touch control layer; and
  deciding whether the first distance is larger than the first preset threshold.

6. The method of claim 5, wherein the detecting to obtain the first distance between the touch control unit and the first object specifically comprises:
  detecting whether there is a first operation at the first active touch point of the electronic apparatus;
  generating a first control instruction when there is the first operation at the first active touch point; and
  detecting the first distance between the touch control unit and the first object by the first touch control layer based on the first control instruction.

7. The method of claim 4, wherein when the electronic apparatus has a third touch control layer and wherein the third power consumption corresponding to the third touch control layer is larger than the second power consumption, after controlling only the second touch control layer to be in working status if it is less than the preset threshold, the method further comprising:
  detecting whether the first distance is larger than the second preset threshold based on the second touch control layer;
  controlling only the second touch control layer to be in working status when the first distance is larger than the second preset threshold; and
  controlling only the third touch control layer to be in working status when the first distance is less than the third preset threshold.

8. The method of claim 1, wherein,
  when part of the plurality of touch detecting units are in working status, a first plurality of touch detection points can be formed within the detection range; and
  when all of the plurality of touch detecting units are in working status, a second plurality of touch detection points can be formed within the detection range.

9. The method of claim 8, wherein, the detection range is part of or entire range of the touch control unit, the detection range includes a first touch detection section and a second touch detection section, the first touch detection section is formed when part of the plurality of touch detecting units are in working status, the first touch detection section includes a first plurality of touch detection points, the second touch detection section includes a third plurality of touch detection points, the number of the third plurality of touch detections is equal to the number of the second plurality of touch detection points subtracting the number of the first plurality of touch detection points, wherein, the touch detection points in the first touch detection section and the touch detection points in the second touch detection section are arranged crossing with each other.

10. The method of claim 9, wherein, the touch control unit is a touch control unit of projected capacitive type, the detection range includes the touch detecting units of R rows by S columns, each touch detecting unit forms a touch detection point, the first touch detection section includes the touch detection point of r rows by s columns in the touch detecting units of R rows by S columns, the second touch detection section includes the remaining touch detection points in the touch detecting units of R rows by S columns, wherein, R and S are natural numbers larger than 1, r is a natural number greater than or equal to 1 and less than or equal to R, s is a natural number greater than or equal to 1 and less than or equal to S, and r by s is less than R by S,
  wherein the controlling part of the plurality of touch detecting units to be in working status comprises controlling the touch detecting units of r rows by s columns to be in working status to form the touch detecting point of r rows by s columns.

11. The method of claim 9, wherein, the touch control unit is a touch control unit of infrared ray type, the detection range includes R touch detecting units corresponding to R rows and S touch detecting units corresponding to S columns, wherein, each touch detecting unit includes an the infrared transmitting unit and an infrared receiving unit, each cross point of the infrared ray transmitted between the infrared transmitting unit and the infrared receiving unit corresponding to rows with the infrared ray transmitted between the infrared transmitting unit and the infrared receiving unit corresponding to columns forms the touch detection point,
  wherein the controlling part of the plurality of touch detecting units to be in working status comprises:
  controlling r touch detecting units in the R touch detecting units to be in working status, controlling s touch detecting units in the S touch detecting units to be in working status, wherein, R and S are natural numbers larger than 1, r is a natural number greater than or equal to 1 and less than or equal to R, s is a natural number greater than or equal to 1 and less than or equal to S, and r by s is less than R by S.

12. The method of claim 9, wherein, the touch control unit is a touch control unit of surface acoustic wave type, the detection range includes R touch detecting units corresponding to R rows and S touch detecting units corresponding to S columns, wherein, each cross point of the ultrasonic wave transmitted by the touch detecting unit corresponding to rows with the ultrasonic wave transmitted by the touch detecting unit corresponding to columns forms the touch detection point;
  wherein, the controlling part of the plurality of touch detecting units to be in working status comprises:
  controlling r touch detecting units in the R touch detecting units to be in working status, controlling s touch detecting units in the S touch detecting units to be in working status, wherein, R and S are natural numbers larger than 1, r is a natural number greater than or equal to 1 and less than or equal to R, s is a natural number greater than or equal to 1 and less than or equal to S, and r by s is less than R by S.

13. The method of claim 1, wherein the electronic apparatus comprises at least a display screen, the touch control unit is arranged in association with the display screen and supports the touch control function, and the touch control unit has a plurality of touch detecting units, the method further comprising:
  determining a detection range on the touch control unit;
  controlling part of the plurality of touch detecting units to be in working status within the detection range to detect the start position where touch occurs.

14. An electronic apparatus having a touch control unit and at least one operating icon being fixedly located on the touch control unit, comprising:
  a first determining unit configured for determining a first determining unit corresponding to the at least one operating icon, wherein, an area of the first determining unit is less than an area of the touch control unit;
  a second determining unit configured for determining a second touch region on the touch control unit according to the first touch region, wherein, the second touch region is a region other than the first touch region on the touch control unit;
  a generating unit configured for generating a control instruction for making touch function of the second touch region to be in a disable status;
  an executing unit configured for executing the control instruction to make the touch function of the second touch region to be in the disable status,
  a display screen;
  the touch control unit arranged in association with the display screen and supporting the touch control function, the touch control unit including a plurality of touch detecting units; and
  touch detection control means, and
  wherein, the touch control unit has a first touch detection mode and a second touch detection mode, and the touch detection control means determines the detection range of the touch control unit in advance and controls switching of the first touch detection mode and the second touch detection mode,
  in the first touch detection mode, the touch detection control means controls part of the plurality of touch detecting units to be in working status to detect a start position of first-point touch where touch occurs, and
  once the first-point touch is detected, the touch detection control means controls the remaining touch detecting units of the plurality of touch detecting units to change from the disable status to the working status, so that all of the plurality of touch detecting units being in working status.

15. The electronic apparatus of claim 14, wherein, the electronic apparatus further includes:
  a shell;
  the touch control unit being provided on the surface of the shell, specifically including a first touch control layer and a second touch control layer, wherein, a first power consumption corresponding to the first touch control layer is less than a second power consumption corresponding to the second touch control layer;
  a detecting unit connected to the touch control unit for detecting whether a first distance between the touch control unit and a first object is larger than a first preset threshold; and
  a control unit connected to the detecting unit for controlling the first touch control layer to be in working status and the second touch control layer to be in non-working status if the detection result indicates that the first distance is larger than the first preset threshold; and controlling only the second touch control layer to be in working status if the detection result indicates that the first distance is less than the preset threshold.

16. The electronic apparatus of claim 15, wherein, the electronic apparatus further includes:
  a display screen;
  the touch control unit arranged in association with the display screen and supporting the touch control function, the touch control unit including a plurality of touch detecting units; and
  touch detection control means,
  wherein, the touch control unit has a first touch detection mode and a second touch detection mode, and the touch detection control means determines the detection range of the touch control unit and controls switching of the first touch detection mode and the second touch detection mode,
  wherein, in the first touch detection mode, the touch detection control means controls part of the plurality of touch detecting units to be in working status to detect the start position where touch occurs.

17. A method of electronic apparatus applied in an electronic apparatus, the electronic apparatus including a touch control unit that has a first touch region and a second touch region, at least one operating icon in the first touch region, a first operating icon in the at least one operating icon, the second touch region being a region other than the first touch region on the touch control unit, comprising:
  detecting whether there is an open operation for opening touch function of the first touch region when the touch function of the first touch region is in a disable status;
  generating a touch function open instruction in response to the open operation when there is the open operation; and
  executing the touch function open instruction to make the touch function of the first touch region to be in an enable status,
  wherein, the electronic apparatus at least has a display screen, the touch control unit is arranged in association with the display screen and supports the touch control function, and the touch control unit has a plurality of touch detecting units,
  the method further comprising:
  determining a detection range on the touch control unit in advance;
  controlling a part of the plurality of touch detecting units to be in working status within the detection range to detect a start position of first point touch where touch occurs, and
  once the first-point touch is detected, the touch detection control means controls the remaining touch detecting units of the plurality of touch detecting units to change from the disable status to the working status, so that all of the plurality of touch detecting units being in working status.

18. The method of claim 17, after executing the touch function open instruction to make the touch function of the first touch region to be in the enable status, further comprising:
  detecting whether there is a touch operation in the first touch region to obtain a detection result;
  deciding whether the touch operation is the touch operation for touching to open the first operating icon in the first touch region when the detection result is YES to obtain a first decision result; and
  generating a touch open instruction according to the touch operation when the first decision result is YES to control to open the first operating icon.

19. The method of claim 18, wherein, the deciding whether the touch operation is the touch operation for touching to open the first operating icon in the first touch region comprises:
- obtaining coordinate information of the touch operation, wherein, the coordinate information includes a start coordinate information and an end coordinate information;
- deciding, in the first touch region, whether the coordinate information satisfies a threshold of the coordinate information of the first operating icon in the first touch region to obtain the first decision result.

20. The method of claim 19, wherein, the deciding, in the first touch region, whether the coordinate information satisfies a threshold of the coordinate information of the first operating icon in the first touch region comprises:
- deciding whether the start coordinate information satisfies a threshold of the start coordinate information of the first operating icon in the first touch region; or
- deciding whether the end coordinate information satisfies a threshold of the end coordinate information of the first operating icon in the first touch region; or
- deciding whether the start coordinate information and the end coordinate information satisfy the threshold of the start coordinate information of the first operating icon in the first touch region and the threshold of the end coordinate information of the first operating icon in the first touch region respectively.

21. An electronic apparatus having a touch control unit, which has a first touch region and a second touch region, wherein, the first touch region and the second touch region are generated by the method according to any one of the above-described claim 1, there is at least one operating icon in the first touch region, there is a first operating icon in the at least one operating icon, the second touch region is a region other than the first touch region on the touch control unit, wherein, the electronic apparatus comprises:
- a detecting unit for detecting whether there is an open operation for opening touch function of the at least one touch region when the touch function of the first touch region is in a disable status;
- a generating unit for generating a touch function open instruction in response to the open operation when there is the open operation; and
- an executing unit for executing the touch function open instruction to make the touch function of the first touch region to be in an enable status,
- a display screen;
- the touch control unit arranged in association with the display screen and supporting the touch control function, the touch control unit including a plurality of touch detecting units; and
- touch detection control means, and
- wherein, the touch control unit has a first touch detection mode and a second touch detection mode, and the touch detection control means determines the detection range of the touch control unit in advance and controls switching of the first touch detection mode and the second touch detection mode,
- in the first touch detection mode, the touch detection control means controls part of the plurality of touch detecting units to be in working status to detect a start position of first-point touch where touch occurs, and
- once the first-point touch is detected, the touch detection control means controls the remaining touch detecting units of the plurality of touch detecting units to change from the disable status to the working status, so that all of the plurality of touch detecting units being in working status.

* * * * *